US012257833B2

(12) United States Patent
Araki

(10) Patent No.: US 12,257,833 B2
(45) Date of Patent: Mar. 25, 2025

(54) LIQUID DISCHARGE APPARATUS, HEAD DRIVE CONTROLLER, AND LIQUID DISCHARGE METHOD

(71) Applicant: Satomi Araki, Kanagawa (JP)

(72) Inventor: Satomi Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 227 days.

(21) Appl. No.: 17/884,426

(22) Filed: Aug. 9, 2022

(65) Prior Publication Data

US 2023/0079595 A1 Mar. 16, 2023

(30) Foreign Application Priority Data

Sep. 13, 2021 (JP) ................................ 2021-148896

(51) Int. Cl.
*B41J 2/045* (2006.01)

(52) U.S. Cl.
CPC ....... *B41J 2/04573* (2013.01); *B41J 2/04541* (2013.01); *B41J 2/0458* (2013.01); *B41J 2/04581* (2013.01)

(58) Field of Classification Search
CPC .. B41J 2/04573; B41J 2/04541; B41J 2/0458; B41J 2/04581; B41J 2002/14362; B41J 2202/19; B41J 2202/20; B41J 2/04553; B41J 2/04571; B41J 2/04588; B41J 2/0459; B41J 2/04591; B41J 2/14274; B41J 2/04508; B41J 2/04535; B41J 2/0454; B41J 2/04563; B41J 2/04596
See application file for complete search history.

(56) References Cited

U.S. PATENT DOCUMENTS

| | | | | |
|---|---|---|---|---|
| 2021/0001629 A1* | 1/2021 | Yoshida | .............. | B41J 2/04516 |
| 2021/0162746 A1 | 6/2021 | Araki | | |
| 2022/0063263 A1* | 3/2022 | Arakane | ............. | B41J 2/04551 |

FOREIGN PATENT DOCUMENTS

| | | |
|---|---|---|
| JP | 10-202875 | 8/1998 |
| JP | 2011-056729 | 3/2011 |
| JP | 2012-125998 | 7/2012 |
| JP | 2021-084427 | 6/2021 |

* cited by examiner

*Primary Examiner* — Kristal Feggins
(74) *Attorney, Agent, or Firm* — Duft & Bornsen, PC

(57) ABSTRACT

A liquid discharge apparatus includes: a liquid discharge head configured to discharge a liquid from a nozzle, the liquid discharge head including: a liquid chamber communicating with the nozzle; a pressure generator configured to deform the liquid chamber to apply pressure to the liquid in the liquid chamber; and circuitry configured to apply a drive signal to the pressure generator to drive the pressure generator, the drive signal including at least one drive pulse. The drive pulse includes: an expansion element to expand the liquid chamber to a first volume; a holding element to hold the first volume of the liquid chamber expanded by the expansion element for a predetermined time; and a contraction element to contract the liquid chamber from the first volume held by the holding element to a second volume.

15 Claims, 19 Drawing Sheets

COMPARATIVE EXAMPLE

COMPARATIVE EXAMPLE

COMPARATIVE EXAMPLE

LIQUID DISCHARGE APPARATUS, HEAD DRIVE CONTROLLER, AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2021-148896, filed on Sep. 13, 2021, in the Japan Patent Office, the entire disclosure of which is hereby incorporated by reference herein.

BACKGROUND

Technical Field

Aspect of the present disclosure relates to a liquid discharge apparatus, a head drive controller, and a liquid discharge method.

Related Art

A printer inserts a residual vibration suppression waveform to suppress residual vibration of a nozzle meniscus after a droplet discharge pulse (drive pulse) that drives a liquid discharge head to reduce a discharge droplet speed controlled by a drive frequency. Viscosity of a discharge liquid discharged by the liquid discharge head varies depending on an installation environment temperature of the printer mounting the liquid discharge head. Accordingly, the residual vibration of the meniscus also changes. Therefore, a temperature sensor is provided in the liquid discharge head or the printer. Further, a drive waveform is selected. The residual vibration suppression waveform in the drive waveform is adjusted for each installation environment temperature.

SUMMARY

A liquid discharge apparatus includes: a liquid discharge head configured to discharge a liquid from a nozzle, the liquid discharge head including: a liquid chamber communicating with the nozzle; a pressure generator configured to deform the liquid chamber to apply pressure to the liquid in the liquid chamber; and circuitry configured to apply a drive signal to the pressure generator to drive the pressure generator, the drive signal including at least one drive pulse. The drive pulse includes: an expansion element to expand the liquid chamber to a first volume; a holding element to hold the first volume of the liquid chamber expanded by the expansion element for a predetermined time; and a contraction element to contract the liquid chamber from the first volume held by the holding element to a second volume, and the circuitry is configured to change a time from a start of the expansion element to an end of the holding element based on viscosity of the liquid or a head temperature that is a temperature in a vicinity of the liquid discharge head.

A head drive controller includes: circuitry configured to apply a drive signal to a liquid discharge head to drive the liquid discharge head to discharge a liquid, the drive signal including at least one drive pulse, wherein the drive pulse includes: an expansion element to expand a liquid chamber in the liquid discharge head to a first volume; a holding element to hold the first volume of the liquid chamber expanded by the expansion element for a predetermined time; and a contraction element to contract the liquid chamber from the first volume held by the holding element to a second volume, and the circuitry is configured to change a time from a start of the expansion element to an end of the holding element based on viscosity of the liquid or a head temperature that is a temperature in a vicinity of the liquid discharge head.

A liquid discharge method for driving a liquid discharge head to discharge a liquid, the method includes: applying a drive signal to the liquid discharge head to drive the liquid discharge head to discharge the liquid, the drive signal including at least one drive pulse, wherein the applying the drive signal comprising: expanding a liquid chamber in the liquid discharge head to a first volume in an expansion element; holding the first volume of the liquid chamber expanded by the expansion element for a predetermined time in a holding element; and contracting the liquid chamber from the first volume held by the holding element to a second volume in a contraction element, and changing a time from a start of the expansion element to an end of the holding element based on viscosity of the liquid or a head temperature that is a temperature in a vicinity of the liquid discharge head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
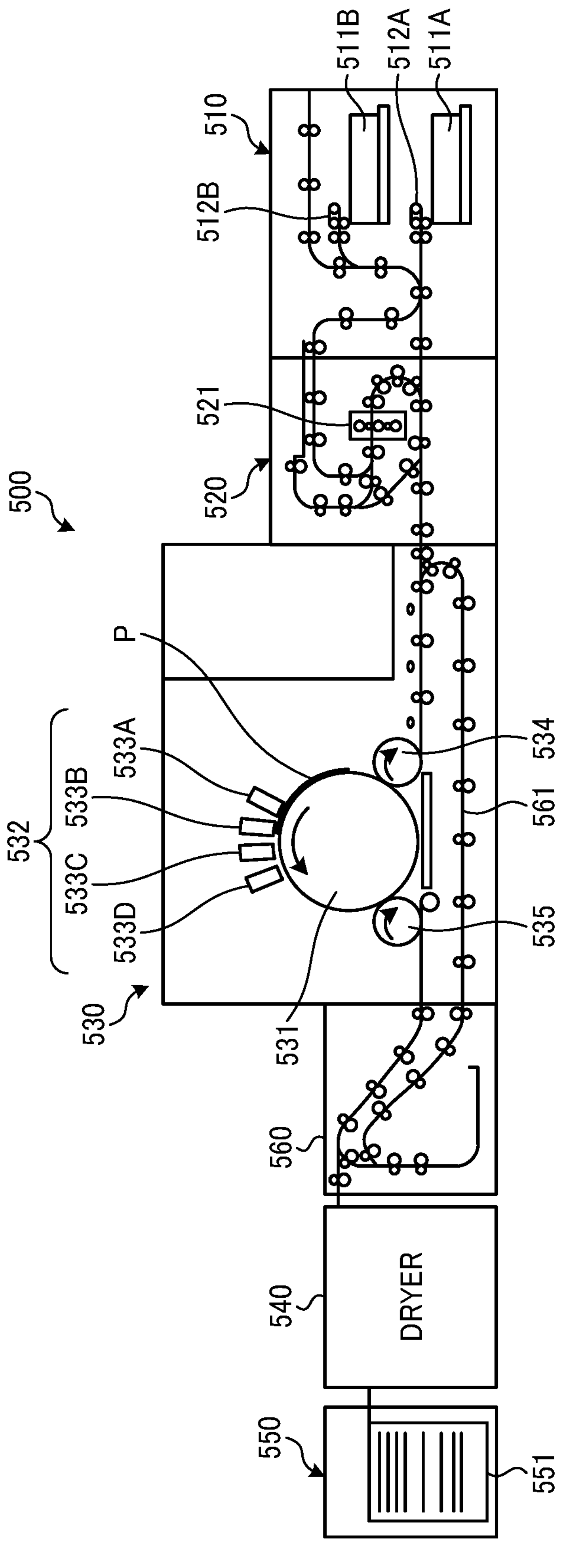
FIG. 1 is a schematic side view of a printer according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that 5 each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

It will also be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements present. Referring now to the drawings, wherein like reference numerals designate identical or corresponding parts throughout the several views, embodiments of the present disclosure are described below.

Hereinafter, embodiments of a printer to which a liquid discharge apparatus and a head drive controller are applied is described in detail below with reference to the accompanying drawings.

First Embodiment

FIG. 1 is a schematic side view of a printer 500 according to a first embodiment of the present disclosure.

Figure 2:
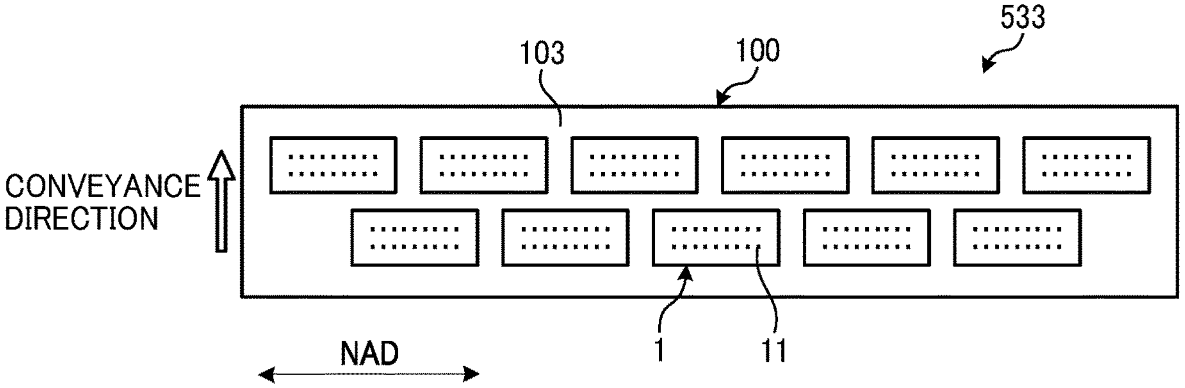
FIG. 2 is a schematic plan view of a discharge unit of the printer according to the first embodiment.

FIG. 2 is a schematic plan view of a discharge unit 533 of the printer 500 according to the first embodiment.

Referring to FIGS. 1 and 2, a description is given of an example of the printer 500 as a liquid discharge apparatus according to the first embodiment of the present disclosure.

A printer 500 according to the first embodiment includes a loading unit 510 to load a sheet P into the printer 500, a pretreatment unit 520, a printing unit 530, a drying unit 540, and an ejection unit 550. In the printer 500, the pretreatment unit 520 applies, as desired, pretreatment liquid onto the sheet P fed (supplied) from the loading unit 510. The printer 500 applies a liquid to a sheet P conveyed from the pretreatment unit 520 by the printing unit 530 to perform desired printing, dries the liquid adhering to the sheet P by the drying unit 540, and ejects the sheet P to the ejection unit 550.

The loading unit 510 includes loading trays 511 (a lower loading tray 511A and an upper loading tray 511B) to accommodate multiple sheets P and feeding devices 512 (a feeding device 512A and a feeding device 512B) to separate and feed the multiple sheets P one by one from the loading trays 511, and supplies the sheet P to the pretreatment unit 520.

The pretreatment unit 520 includes, e.g., a coater 521 as a treatment-liquid 5 application unit that coats a printing surface of a sheet P with a treatment liquid having an effect of aggregation of ink particles to prevent bleed-through.

The printing unit 530 includes a drum 531 and a liquid discharge device 532. The drum 531 is a bearer (rotator) that bears the sheet P on a circumferential surface of the drum 531 and rotates in a counter-clockwise direction indicated by arrow in FIG. 1. The liquid discharge device 532 discharges liquids toward the sheet P borne on the drum 531.

The printing unit 530 includes transfer cylinders 534 and 535. The transfer cylinder 534 receives the sheet P fed from the pretreatment unit 520 and forwards the sheet P to the drum 531. The transfer cylinder 535 receives the sheet P conveyed by the drum 531 and forwards the sheet P to a reverse mechanism 560.

The transfer cylinder 534 includes a sheet gripper to grip a leading end of the sheet P conveyed from the pretreatment unit 520 to the printing unit 530. The sheet P thus gripped is conveyed as the transfer cylinder 534 rotates. The transfer cylinder 534 forwards the sheet P fed from the transfer cylinder 534 to the drum 531 at a position opposite (facing) the drum 531.

Similarly, the drum 531 includes a sheet gripper on a surface of the drum 531, and the leading end of the sheet P is gripped by the sheet gripper of the drum 531. The drum 531 includes multiple suction holes dispersed on a surface of the drum 531. A suction device generates suction airflows directed from desired suction holes of the drum 531 to an interior of the drum 531.

The sheet gripper of the drum 531 grips the leading end of the sheet P forwarded from the transfer cylinder 534 to the drum 531, and the sheet P is attracted to and borne on the drum 531 by the suction airflows generated by the suction device. As the drum 531 rotates, the sheet P is conveyed.

The liquid discharge device 532 includes discharge units 533 (533A to 533D) to discharge liquids of each color, for example, yellow (Y), cyan (C), magenta (M), and black (K). For example, the discharge unit 533A discharges a liquid of cyan (C), the discharge unit 533B discharges a liquid of magenta (M), the discharge unit 533C discharges a liquid of yellow (Y), and the discharge unit 533D discharges a liquid of black (K), respectively. Further, the discharge units 533 may discharge a special liquid, that is, a liquid of spot color such as white, gold, or silver.

The discharge unit 533 is a full line head and includes multiple liquid discharge heads 1 arranged in a staggered manner on a base 103 (see FIG. 2). Each of the multiple liquid discharge heads 1 includes multiple nozzle arrays and multiple nozzles 11 arranged in each of the multiple nozzle arrays as illustrated in FIG. 2, for example.

Hereinafter, the "liquid discharge head 1" is simply referred to as a "head 1". The nozzle array is arranged in a nozzle array direction indicated by arrow "NAD" in FIG. 2.

A discharge operation of each of the discharge units 533 of the liquid discharge device 532 is controlled by a drive signal corresponding to print data. When the sheet P borne on the drum 531 passes through a region facing the liquid discharge device 532, the liquids of respective colors are discharged from the discharge units 533 toward the sheet P, and an image corresponding to the print data is formed on the sheet P.

The reverse mechanism 560 reverses, in switchback manner, the sheet P that has fed from the transfer cylinder 535 in double-sided printing. The reversed sheet P is fed back to an upstream of the transfer cylinder 534 through a conveyance passage 561 of the printing unit 530.

The drying unit 540 dries the liquid adhered onto the sheet P by the printing unit 530. Thus, the liquid component such as water in the liquid evaporates, the colorant contained in the liquid is fixed on the sheet P, and curling of the sheet P is reduced.

The ejection unit 550 includes the ejection tray 551 on which the multiple sheets P are stacked. The multiple sheets P conveyed from the drying unit 540 is sequentially stacked and held on the ejection tray 551.

In the present embodiment, an example in which the sheet is a cut sheet is described. However, embodiments of the present disclosure can also be applied to an apparatus using a continuous medium (web) such as continuous paper or roll paper, an apparatus using a sheet such as wallpaper, and the like.

Figure 3:
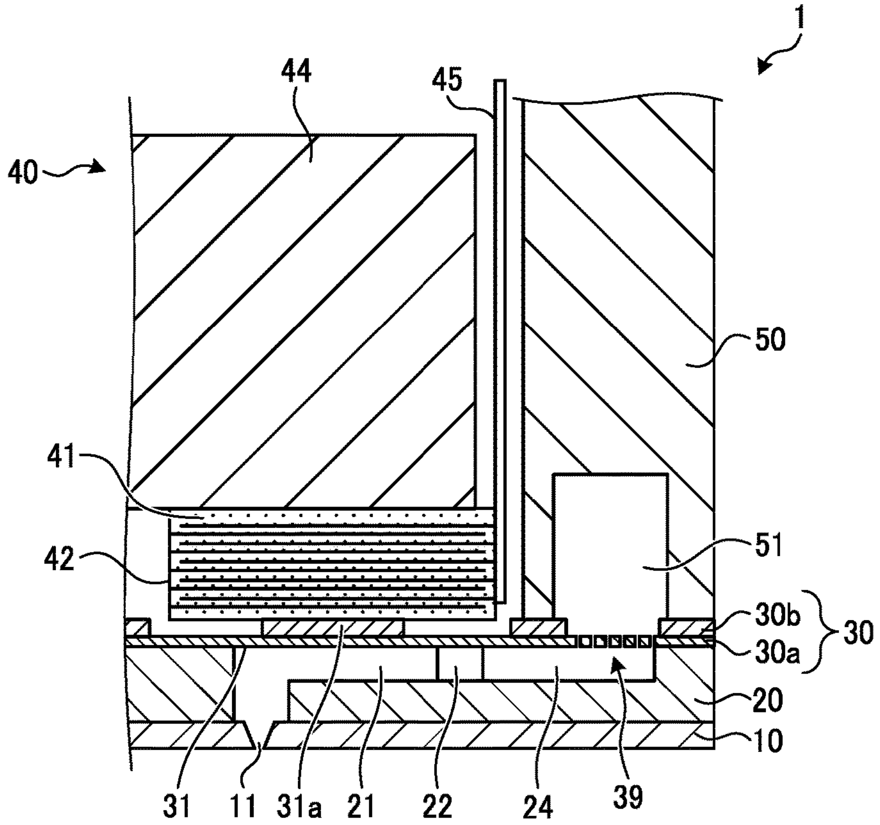
FIG. 3 is a cross-sectional view of a liquid discharge head in the printer according to the first embodiment in a direction orthogonal to a nozzle array direction.

FIG. 3 is a cross-sectional view of the head 1 according to the first embodiment in a direction orthogonal to the nozzle array direction NAD.

Figure 4:
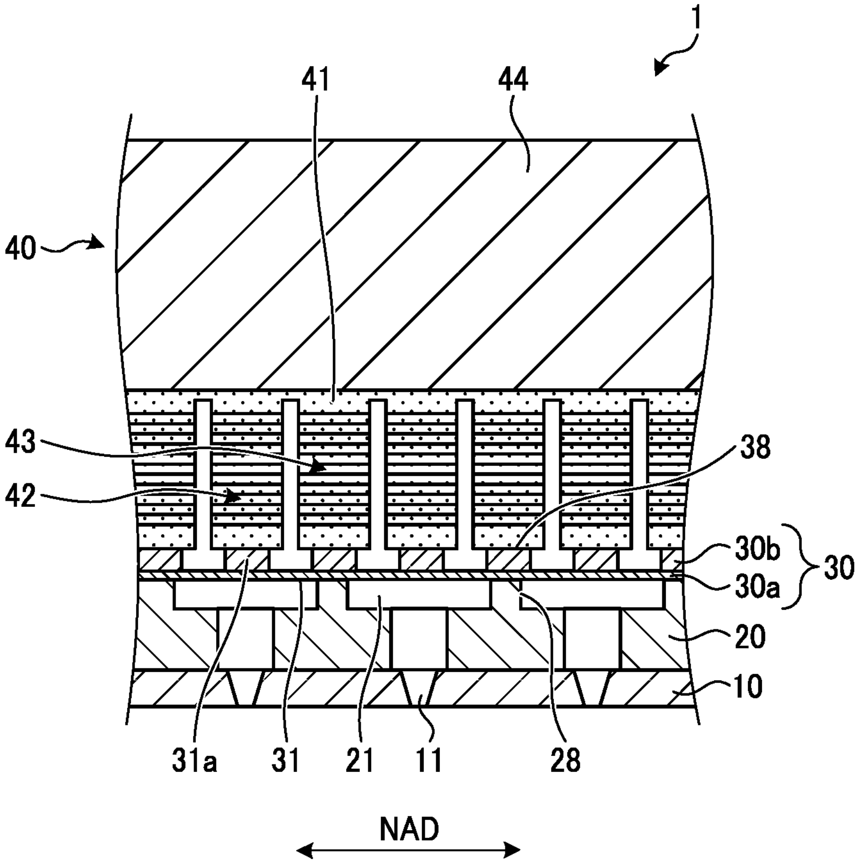
FIG. 4 is a cross-sectional view of the liquid discharge head in the printer according to the first embodiment in the nozzle array direction.

FIG. 4 is a cross-sectional view of the head 1 in the printer 500 according to the first embodiment in the nozzle array direction NAD.

Next, an example of a configuration of the head 1 in the printer 500 according to the first embodiment is described below with reference to FIGS. 3 and 4.

The head 1 in the first embodiment includes a nozzle plate 10, a channel plate 20, and a diaphragm member 30 laminated and bonded with each other. The diaphragm member 30 serves as a wall surface member. The head 1 includes a piezoelectric actuator 40 and a common channel member 50. The piezoelectric actuator 40 displaces a diaphragm 31 (vibration region) of the diaphragm member 30. The common channel member 50 also serves as a frame of the head 1.

The nozzle plate 10 includes a nozzle array in which multiple nozzles 11 are arrayed in the nozzle array direction NAD in FIG. 4.

The channel plate 20 includes (forms) multiple pressure chambers 21, multiple individual supply channels 22, and multiple intermediate supply channels 24. The multiple pressure chambers 21 respectively communicate with the multiple nozzles 11. The pressure chamber 21 is an example of a liquid chamber. The multiple individual supply channels 22 also serve as fluid restrictors.

The multiple individual supply channels 22 respectively communicate with multiple pressure chambers 21. The multiple intermediate supply channels 24 respectively communicate with multiple individual supply channels 22. A number of each of the intermediate supply channel 24 and the individual supply channel 22 may be one or more. Adjacent pressure chambers 21 are separated by a partition wall 28 (see FIG. 4).

The diaphragm member 30 includes multiple displaceable diaphragm 31 (vibration regions) that form walls of the pressure chambers 21 in the channel plate 20. The diaphragm member 30 has a two-layer structure (not limited), and includes a first layer 30*a* forming a thin portion from the channel plate 20 side and a second layer 30*b* forming a thick portion.

The displaceable diaphragm 31 (vibration region) is formed in a portion corresponding to the pressure chamber 21 in the first layer 30*a* that is a thin portion. The diaphragm 31 (vibration region) includes an island-shaped convex portion 31*a* that is a thick portion bonded to the piezoelectric actuator 40 in the second layer 30*b*. In addition, a bonding portion 38, which is a thick portion, is formed of the second layer 30*b* in a portion of the diaphragm member 30 corresponding to the partition wall 28. The bonding portion 38 is formed in the thick portion between the pressure chambers 21.

The head 1 includes the piezoelectric actuator 40 on a side of the diaphragm member 30 opposite a side facing the pressure chamber 21. The piezoelectric actuator 40 includes an electromechanical transducer element (piezoelectric element 42) serving as a pressure generator to deform the diaphragm 31 (vibration region) of the diaphragm member 30. The pressure generator is also referred to as a driver or an actuator.

In the piezoelectric actuator 40, a piezoelectric member 41 bonded on a base 44 is grooved by half-cut dicing, to form a desired number of columnar piezoelectric elements 42 and supports 43 at predetermined intervals in a comb shape.

The piezoelectric element 42 is a piezoelectric element that is applied with a drive voltage (application voltage) to displace the diaphragm 31 (vibration region). The piezoelectric element 42 is an example of a pressure generator that deforms the diaphragm 31 (vibration region) based on a change in the drive voltage to apply pressure on a liquid in the pressure chamber 21. The support 43 is a piezoelectric element that supports the partition wall 28 between the pressure chambers 21. The drive voltage is not applied to the support 43.

The piezoelectric element 42 is bonded to an island-shaped convex portion 31*a* with an adhesive. The convex portion 31*a* is a thick portion in the diaphragm 31 (vibration region) of the diaphragm member 30. The support 43 is bonded to the bonding portion 38 with an adhesive. The bonding portion 38 is a thick portion disposed at a portion corresponding to the partition wall 28 of the diaphragm member 30.

The piezoelectric element 42 includes piezoelectric layers and internal electrodes 5 alternately laminated on each other. Each internal electrode is led out to an end surface and connected to an external electrode (end surface electrode). The external electrode is connected with a flexible wiring board 45.

The common channel member 50 forms a common supply channel 51. The common supply channel 51 communicates with the intermediate supply channel 24 via a filter 39 in the diaphragm member 30.

In the head 1, for example, the voltage to be applied to the piezoelectric element 42 is lowered from a reference potential (intermediate potential) so that the piezoelectric element 42 contracts to pull the diaphragm 31 (vibration region) of the diaphragm member 30 to increase the volume of the pressure chamber 21. As a result, liquid flows into the pressure chamber 21.

When the voltage applied to the piezoelectric element 42 is raised, the piezoelectric element 42 expands in a direction of lamination of the piezoelectric element 12. The diaphragm 31 (vibration region) of the diaphragm member 30 deforms in a direction toward the nozzle 11 and contracts the volume of the pressure chambers 21. As a result, the liquid in the pressure chambers 21 is pressurized squeezed so that the liquid is discharged from the nozzle 11.

Figure 5:
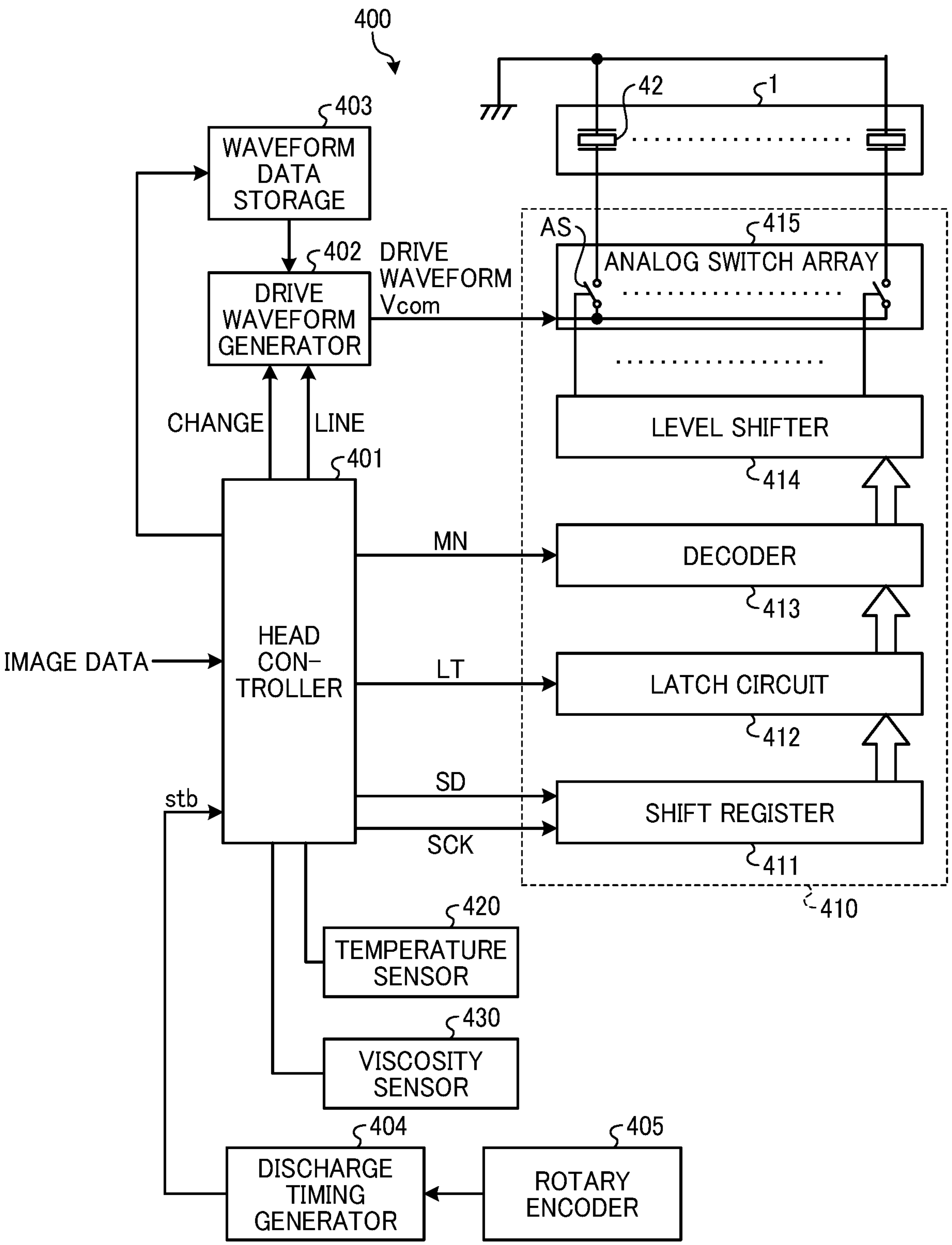
FIG. 5 is a block diagram illustrating an example of a configuration of a head drive controller in the printer according to the first embodiment.

FIG. 5 is a block diagram illustrating an example of a configuration of a head drive controller 400 in the printer 500 according to the first embodiment. Next, a section related to a head drive controller 400 to drive the head 1 is described below with reference to FIG. 5. The head drive controller 400 serves as a circuitry.

The head drive controller 400 includes a head controller 401, a drive waveform generator 402 and a waveform data storage 403 that form a drive waveform generator, a head driver 410, and a discharge timing generator 404 to generate a discharge timing.

In response to a reception of a discharge timing pulse stb, the head controller 401 outputs a discharge synchronization signal LINE that triggers generation of a common drive waveform, to the drive waveform generator 402. The head controller 401 outputs a discharge timing signal CHANGE to the drive waveform generator 402. The discharge timing signal CHANGE corresponds to an amount of delay from the discharge synchronization signal LINE.

The drive waveform generator 402 generates and outputs a common drive waveform Vcom at a timing based on the discharge synchronization signal LINE and the discharge timing signal CHANGE. Here, the common drive waveform Vcom is an example of a drive signal including at least one pulse (drive pulse) that discharges liquid droplets. A temperature sensor 420 is an example of a temperature detector that detects temperature in a 5 vicinity of the head 1. A viscosity sensor 430 is an example of a viscosity detector that detects viscosity of the liquid to be supplied to the head 1. For example, the viscosity sensor 430 may detect the viscosity of the liquid in the pressure chamber 21.

The head controller 401 also serves as a unit that outputs a selection signal for designating a waveform portion to be selected by a selector including an analog switch AS of the head driver 410.

The head controller 401 receives image data. The head controller 401 receives image data and generates a selection signal MN for selecting a predetermined desired waveform portion in the common drive waveform Vcom for each nozzle 11 according to a size of liquid to be discharged from each nozzle 11 of the head 1 and a characteristic variation of the nozzles 11 based on the image data. Accordingly, the selection signals MN are output by the number of nozzles 11. The selection signal MN is a signal at a timing synchronized with the discharge timing signal CHANGE.

The head controller 401 transmits image data SD, a synchronization clock signal SCK, a latch signal LT instructing latch of the image data, and the generated selection signal MN to the head driver 410. The head controller 401 corrects the common drive waveform Vcom generated by the drive waveform generator 402 based on at least one of the temperature detected by the temperature sensor 420 or the viscosity detected by the viscosity sensor 430.

The head driver 410 is a selector that selects a waveform portion to be applied to each pressure generators (piezoelectric element 42) of the head 1 in the common drive waveform Vcom, based on various signals from the head controller 401. In the present embodiment, the head controller 401, the drive waveform generator 402, and the head driver 410 function as an example of a head driver that applies a drive signal to the piezoelectric element 42 to drive the head 1.

The head driver 410 includes a shift register 411, a latch circuit 412, a gradation decoder 413 (decoder), a level shifter 414, and an analog switch array 415.

The shift register 411 receives (inputs) the image data SD and the synchronization clock signal SCK transmitted from the head controller 401 and outputs a resister value to the latch circuit 412. The latch circuit 412 latches each resister value received from the shift register 411 by the latch signal LT transmitted from the head controller 401.

The gradation decoder 413 decodes a value (image data SD) latched by the latch circuit 412 and the selection signal MN for each nozzle 11 and outputs the result to the level shifter 414. The level shifter 414 converts a level of a logic level voltage signal of the gradation decoder 413 to a level at which an analog switch AS of the analog switch array 415 is operatable.

The analog switch AS of the analog switch array 415 is a switch that is turned on or turned off according to an output of the gradation decoder 413 supplied via the level shifter 414. The analog switch AS switches passing and non-passing (blocking) of the common drive waveform Vcom.

The analog switch AS is provided for each nozzle 11 of the head 1 and is coupled to an individual electrode of the piezoelectric element 42 corresponding to each nozzle 11. The common drive waveform Vcom is input to the analog switch AS from the drive waveform generator 402. A timing of the selection signal MN is synchronized with a timing of the common drive waveform signal Vcom as described above.

Therefore, the analog switch AS is switched on or off at an appropriate timing in accordance with the output of the gradation decoder 413 supplied via the level shifter 414. Accordingly, a waveform portion applied to the piezoelectric element 42 corresponding to each nozzle 11 is selected from the common drive waveform Vcom. Thus, the head 1 can control the size of the liquid droplet discharged from the nozzle 111.

The discharge timing generator 404 generates and outputs the discharge timing pulse stb each time the sheet P is moved by a predetermined amount, based on a detection result of a rotary encoder 405 to detect a rotation amount of the drum 531 (see FIG. 1). The rotary encoder 405 includes an encoder wheel that rotates together with the drum 531 and an encoder sensor that reads a slit of the encoder wheel.

Figure 6A:
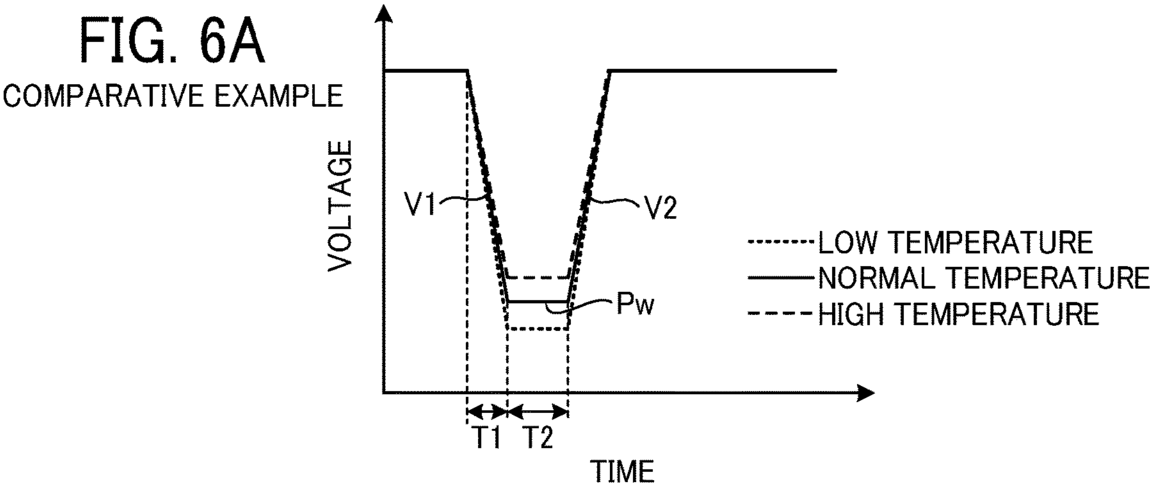
FIGS. 6A to 6C illustrate an example of a drive waveform applied to a piezoelectric element in a liquid discharge head in a printer according to a comparative example.
Figure 6B:
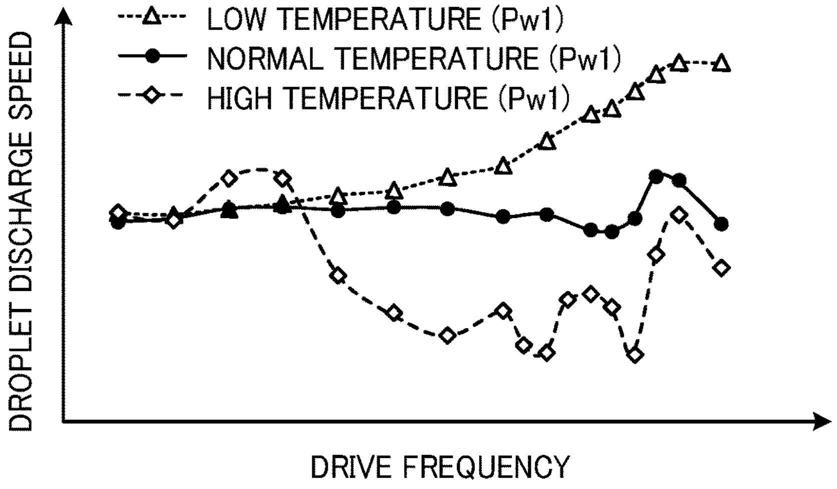
Figure 6C:
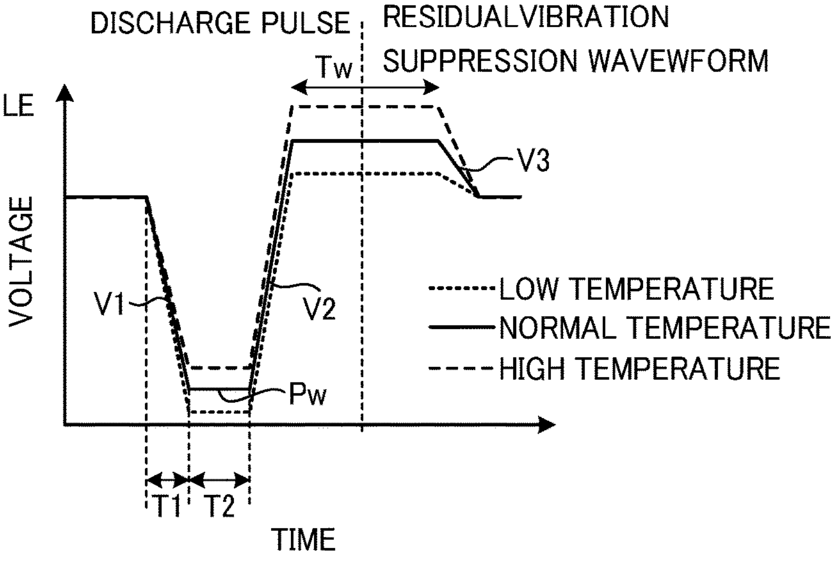

FIGS. 6A and 6C are waveform diagrams of an example of a drive waveform applied to a piezoelectric element in a printer according to a comparative example.

FIG. 6B is a graph illustrating an example of a change in droplet discharge speed in the printer according to the comparative example.

In FIGS. 6A and 6C, a vertical axis represents an application voltage applied to the 5 piezoelectric element, and a horizontal axis represents time.

In FIG. 6B, a vertical axis represents a droplet discharge speed, and a horizontal axis represents a drive frequency of the piezoelectric element. The droplet discharge speed is a speed of the droplet discharged from the nozzle 11. Next, an example of a driving waveform applied to a piezoelectric element in a printer according to the comparative example is described below with reference to FIGS. 6A to 6C.

As illustrated in FIG. 6A, the drive waveform applied to the piezoelectric element in the printer according to the comparative example includes an expansion element V1, a holding element Pw, and a contraction element V2. Here, the expansion element V1 is an element that expands the individual chamber (pressure chamber 21). The holding element Pw is an element (pulse width) that maintains the volume of the individual chamber for a certain period of time after the expansion element V1. Further, the contraction element V2 is an element that causes the individual chamber (pressure chamber 21) to contract after the holding element Pw so that a liquid is discharged from the nozzle 11.

In general, a sum of an application time T1 of the expansion element V1 and an application time T2 of the holding element Pw is set to one half (½) of a resonance period (natural period) of the individual chamber (pressure chamber 21) so that a liquid droplets can be efficiently discharged from the head 1. Further, displacement voltages of the expansion element V1 and the contraction element V2 are increased at a low temperature at which the viscosity of the liquid in the individual chamber (pressure chamber 21) is high.

Further, displacement voltages of the expansion element V1 and the contraction element V2 are decreased at a high temperature at which the viscosity of the liquid in the individual chamber (pressure chamber 21) is low. As a result, it is possible to discharge a liquid droplet from the head 1 at the same droplet discharge speed even if the environmental temperature (installation environmental temperature) at which the head 1 is installed changes.

Thus, the head drive controller 400 (circuitry) is configured to change a time (T1+T2) from a start of the expansion element (V1) to an end of the holding element (Pw) based on viscosity of the liquid or temperature in a vicinity of the head 1.

When the drive waveform illustrated in FIG. 6A is applied to the piezoelectric element, characteristics of the droplet discharge speed greatly deviate (differentiate) depending on the installation environmental temperature of the head 1 with increase in the drive frequency of the piezoelectric element as illustrated in FIG. 6B. The above-described deviation is caused by a refill vibration of the nozzle meniscus after a liquid discharge process of the liquid droplet.

When the installation environment temperature is high (the liquid has low viscosity), a liquid discharge amount for discharging liquid droplets in the next cycle increases in a state in which the nozzle meniscus overflows compared to the nozzle meniscus in a normal temperature (predetermined temperature). As a result, the droplet discharge speed decreases by an amount corresponding to an increase in the liquid amount.

Conversely, when the installation environment temperature is low (the liquid has high viscosity), an opposite phenomenon occurs. For example, the liquid discharge amount decreases in the state in which the nozzle meniscus contacts compared to the nozzle meniscus in the normal temperature (predetermined temperature). Thus, the droplet discharge speed increases by an amount corresponding to a decrease in the liquid amount.

As described above, when the drive frequency characteristic of the droplet discharge 5 speed is largely changed depending on the installation environmental temperature of the head 1, positional deviation of landed dots occurs on a printed image formed on the sheet P. When the installation environmental temperature of the head 1 is high or low, the image quality is degraded. To prevent deterioration of image quality, a residual vibration suppression waveform Tw may be inserted after the discharge pulse (drive waveform) as illustrated in FIG. 6C, for example. The head 1 is preferably driven at high frequency to improve productivity of the printer 500. However, it may be difficult to provide a time for inserting the residual vibration suppression waveform Tw in the drive waveform. It is difficult to suppress fluctuation in the droplet discharge speed by the drive frequency.

Figure 7:
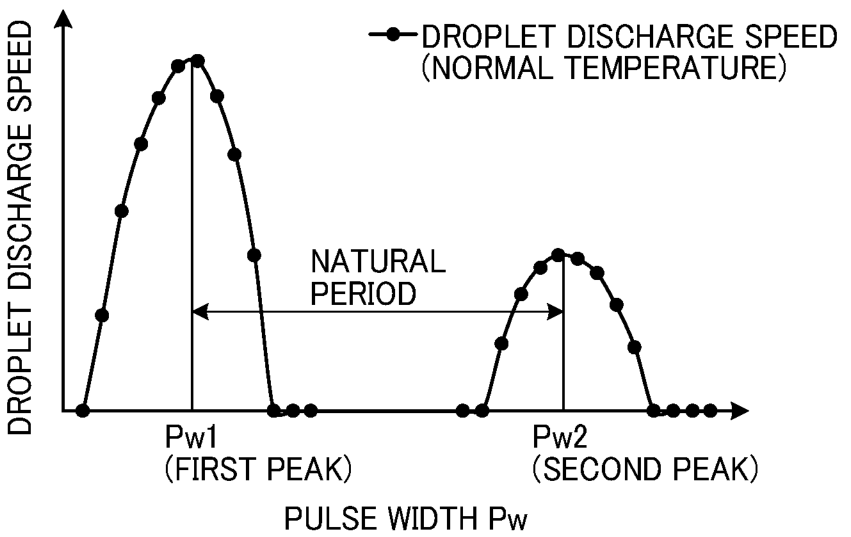
FIG. 7 is a graph illustrating an example of a change in droplet discharge speed in the printer according to the first embodiment when a holding element of a drive waveform is changed.

FIG. 7 is a waveform diagram illustrating an example of a change in the droplet discharge speed when the holding element of the drive waveform is changed. The expansion element V1 included in the drive waveform excites the nozzle meniscus to vibrate at a natural period of the individual chamber (pressure chamber 21). Therefore, duration of the application time T2 of the holding element Pw is varied so that the droplet discharge speed exhibits a behavior having peaks at intervals of integral multiples of the individual chambers (pressure chambers 21) as illustrated in FIG. 7.

In general, the sum of the application time T2 of the first pulse Pw1 and the application time T1 of the expansion element V1 is one half (½) of the natural period of the individual chamber (pressure chamber 21). The first pulse Pw1 is the holding element Pw of the first peak of the droplet discharge speed. Therefore, the sum of the application time T1 of the expansion element V1 and the application time T2 of the holding element Pw is set to one half (½) of a resonance period (natural period) of the individual chamber (pressure chamber 21) so that the head 1 can most efficiently discharge the liquid droplets from the nozzles 11.

Thus, the time (T1+T2) from the start of the expansion element V1 to the end of the 5 holding element Pw is equal to one half (½) of a natural period of the liquid chamber (pressure chamber 21) in response to the viscosity of the liquid being equal to a predetermined viscosity. The time (T1+T2) from the start of the expansion element V1 to the end of the holding element Pw is equal to one half (½) of a natural period of the liquid chamber (pressure chamber 21) in response to temperature in the vicinity of the head 1 being equal to a predetermined temperature.

The viscosity of the liquid is normal viscosity (predetermined viscosity) at the normal temperature (predetermined temperature).

Figure 8A:
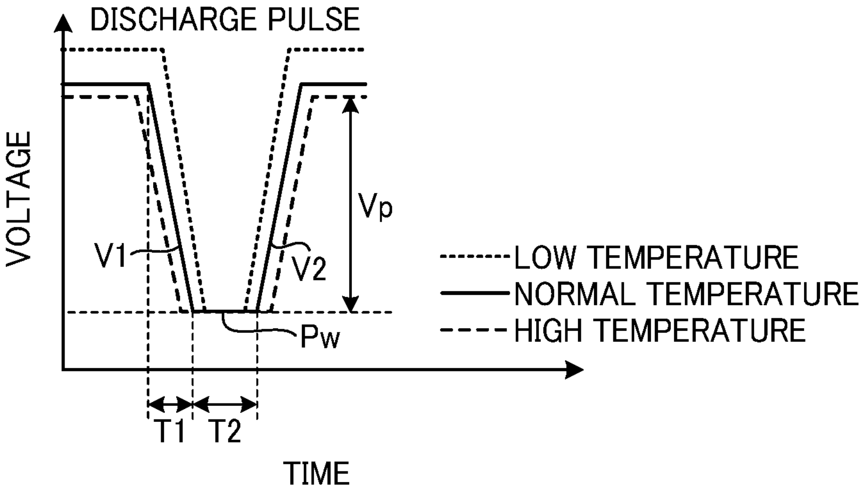
FIGS. 8A to 8C are waveform diagrams illustrating an example of a drive waveform applied to a piezoelectric element in the printer according to the first embodiment of the present disclosure.
Figure 8B:
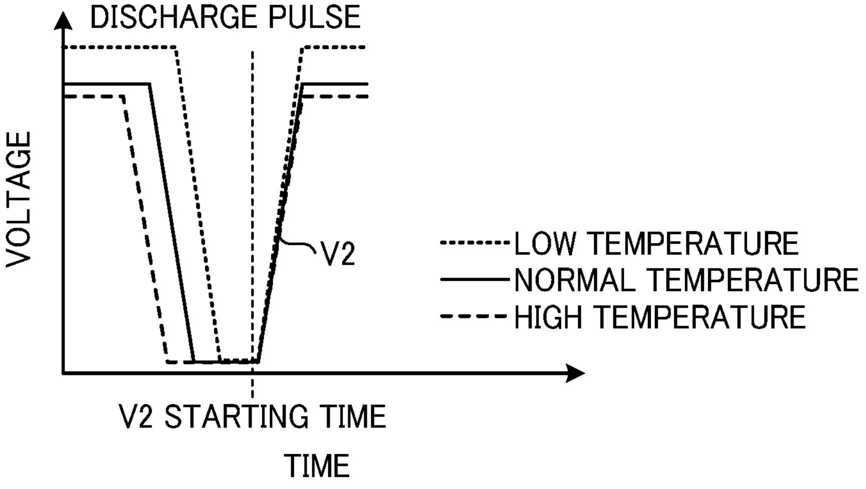
Figure 8C:
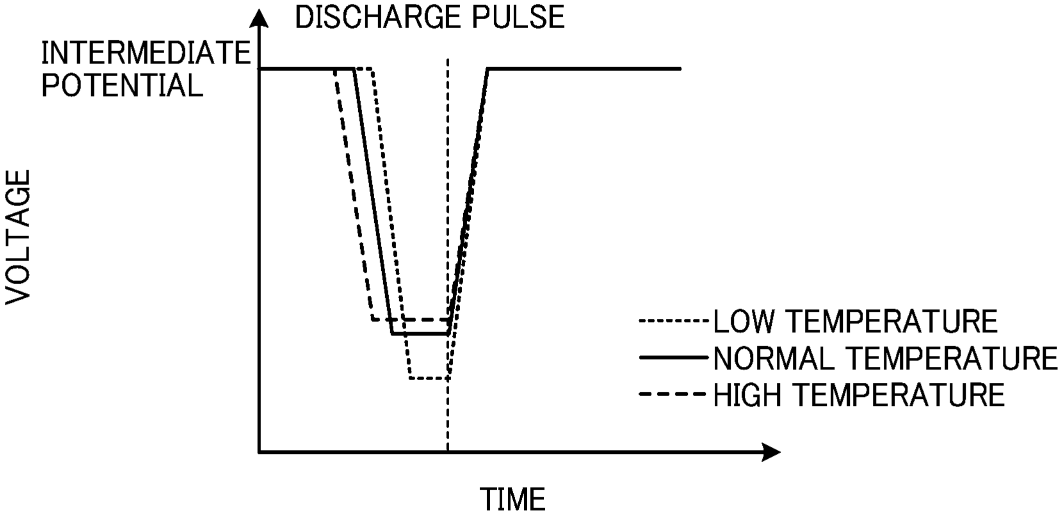

FIGS. 8A to 8C are waveform diagrams illustrating an example of a drive waveform applied to the piezoelectric element 42 in the printer 500 according to the first embodiment of the present disclosure. In FIGS. 8A to 8C, the vertical axis represents the application voltage applied to the piezoelectric element 42, and the horizontal axis represents time.

Figure 9:
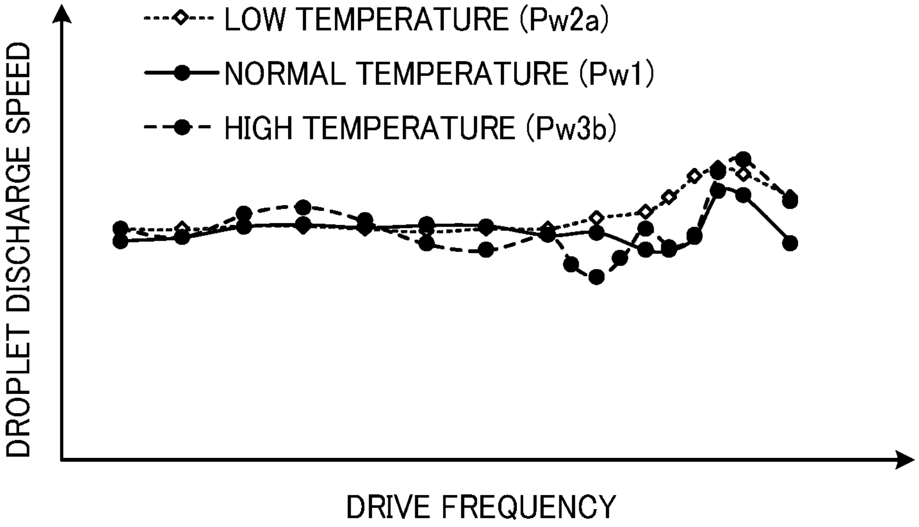
FIG. 9 is a graph illustrating an example of a change in droplet discharge speed in the printer according to the first embodiment.

FIG. 9 is a graph illustrating an example of a change in droplet discharge speed in the printer 500 according to the first embodiment.

FIGS. 10A and 10B, and FIGS. 11A and 11B illustrate an example of a change in the droplet discharge speed, and a relationship between the droplet discharge speed and the drive frequency in the printer 500 according to the first embodiment.

Figure 10A:
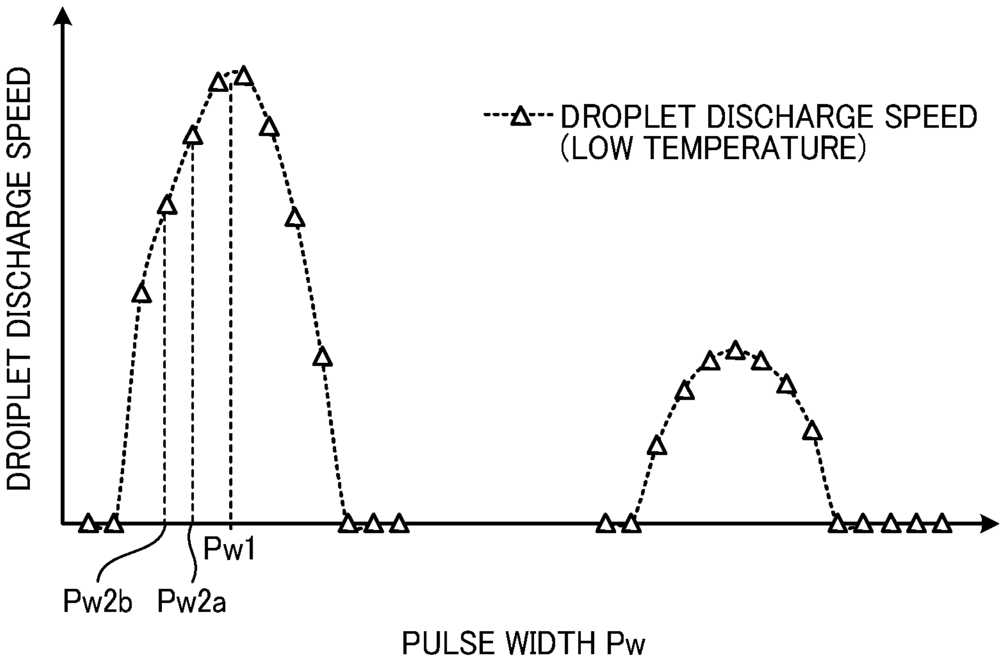
FIGS. 10A and 10B illustrate an example of a change in the droplet discharge speed with a pulse width, and a relationship between the droplet discharge speed and the drive frequency in the printer according to the first embodiment.
Figure 10B:
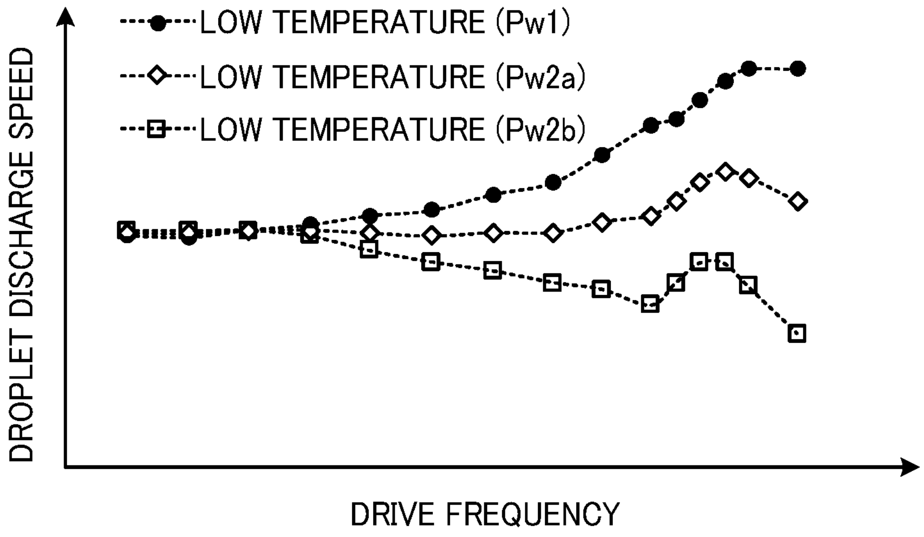
Figure 11A:
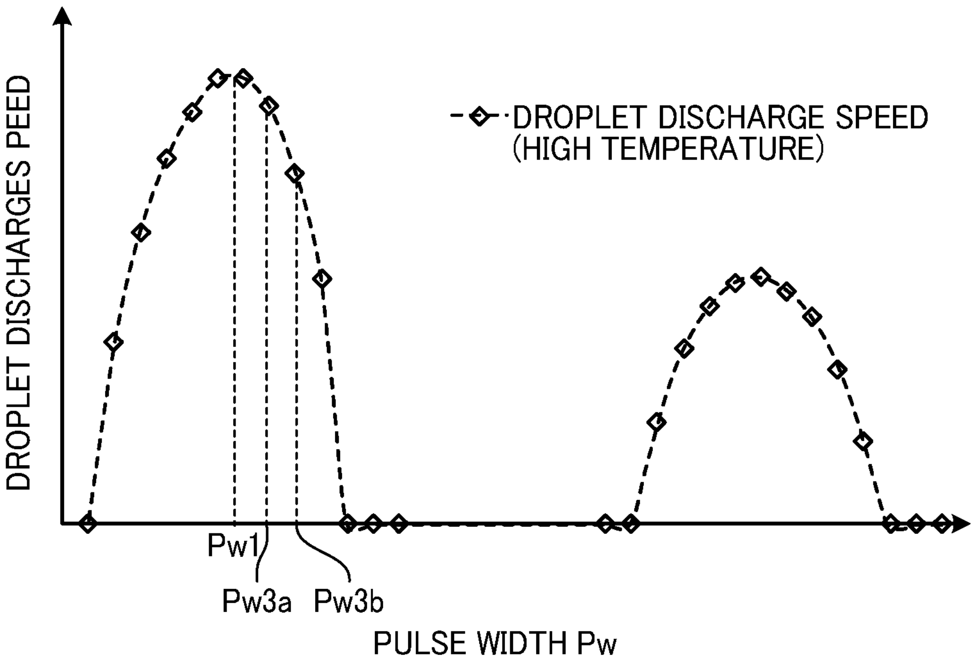
FIGS. 11A and 11B illustrate an example of a change in the droplet discharge speed with a pulse width, and a relationship between the droplet discharge speed and the drive frequency in the printer according to the first embodiment.
Figure 11B:
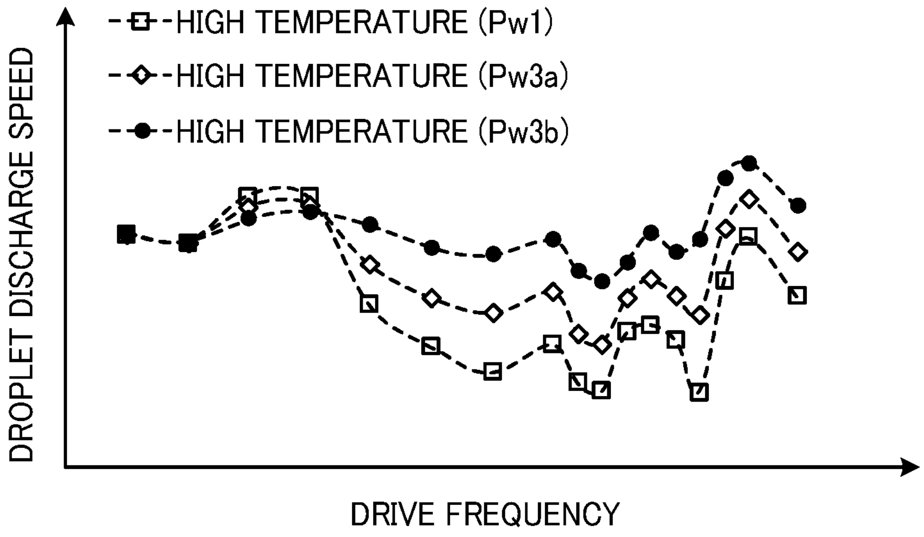

In FIGS. 9, 10B, and 11B, the vertical axis represents the droplet discharge speed, and the horizontal axis represents the drive frequency.

In FIGS. 10A and 11A, the vertical axis represents the droplet discharge speed, and the horizontal axis represents the application time T2 (pulse width) of the holding element Pw. Next, an example of the common drive waveform Vcom applied to the piezoelectric element 42 in the printer 500 according to the present embodiment is described below with reference to FIGS. 8A to 8C to FIGS. 11A and 11B.

The common drive waveform Vcom is an example of a drive signal including one or more drive pulses including an expansion element V1, a holding element Pw, and a contraction element V2. Here, in the printer 500 according to the first embodiment, the application time T2 of the holding element Pw is made longer (wider) when the installation environmental temperature of the head 1 is at a high temperature higher than a normal temperature (predetermined temperature). When the installation environment temperature of the head 1 is at the high temperature, the liquid in the pressure chamber 21 has a low viscosity lower than a predetermined viscosity. The application time T2 of the holding element Pw is made shorter (narrower) when the installation environmental temperature of the head 1 is at a low temperature lower than the normal temperature (predetermined temperature). The liquid 5 in the pressure chamber 21 has a viscosity higher than a predetermined viscosity at the low temperature lower than the normal temperature (predetermined temperature).

In the present embodiment, when the installation environmental temperature is low, the holding element Pw of the common drive waveform Vcom is set to pulse widths Pw2*a* and Pw2*b* (see FIG. 10A) that are shorter than the pulse width Pw1 of the holding element Pw at which the droplet discharge speed reaches a peak.

Specifically, when the installation environment temperature is low, the sum of the application time T1 of the expansion element V1 and the application time T2 of the holding element Pw is made shorter than one half (½) of the natural period of the pressure chamber 21. As a result, it is possible to control to reduce an increase in the droplet discharge speed 5 on a high frequency side of the drive frequency of the piezoelectric element 42.

At this time, the application time V1 of the expansion elements T1 is constant regardless of the viscosity of the liquid in the pressure chamber 21 or the installation environment temperature of the head 1 in the present embodiment. Further, the application time T2 of the holding element Pw differs depending on the viscosity of the liquid in the pressure chamber 21 and the installation environment temperature of the head 1.

Conversely, when the installation environmental temperature is high, the holding element Pw of the common drive waveform Vcom is set to pulse widths Pw3*a* and Pw3*b* (see FIG. 10A) that are longer than the pulse width Pw1 of the holding element Pw at which the droplet discharge speed reaches a peak. Specifically, the sum of the application time T1 of the expansion element V1 and the application time T2 of the holding element Pw is made longer than one half (½) of the natural period of the pressure chamber 21. As a result, it is possible to perform control in a direction of suppressing a decrease in the droplet discharge speed from an intermediate frequency to a high frequency of the drive frequency of the piezoelectric element 42.

At this time, the application time V1 of the expansion elements T1 is constant regardless of the viscosity of the liquid in the pressure chamber 21 or the installation environment temperature of the head 1 in the present embodiment. Further, the application time T2 of the holding element Pw differs depending on the viscosity of the liquid in the pressure chamber 21 and the installation environment temperature of the head 1.

Thus, when the installation environmental temperature is the normal temperature (predetermined temperature), the holding element Pw of the common drive waveform Vcom becomes the pulse width Pw1 (see FIG. 10A) of the holding element Pw at which the droplet discharge speed reaches a peak.

The "predetermined viscosity" is a viscosity of liquid as a reference used for 5 designing the common drive waveform Vcom. The common drive waveform Vcom is designed such that the head 1 can perform a desired performance at the predetermined viscosity of the liquid. For example, the head 1 can suppress the fluctuation of the drive frequency as illustrated in FIG. 9 at the predetermined viscosity of the liquid.

It is not limited to minimalize the fluctuation of the discharge speed with respect to the drive frequency to cause the head 1 to perform the desired performance. For example, the fluctuation (cross talk) of the discharge speed or a discharge volume with respect to a number of nozzles 11 (piezoelectric element 42) that are simultaneously driven is controlled within a desired range to cause the head 1 to perform the desired performance. Further, the holding element Pw is set so that the droplet discharge speed reaches the peak to suppress the 5 fluctuation of the discharge speed due to fluctuation of the holding element Pw.

The "predetermined temperature" is a temperature when the liquid becomes the "predetermined viscosity". The common drive waveform Vcom is designed at the installation environment temperature as the predetermined temperature to enable the head 1 to perform a desired performance at the installation environment temperature that is a temperature in an environment at which the head 1 is installed.

Therefore, as illustrated in FIG. 8A, the application time T2 of the holding element Pw at a high temperature higher than the normal temperature is made longer (wider) than the application time T2 of the holding element Pw at the normal temperature.

Further, as illustrated in FIG. 8A, the application time T2 of the holding element Pw at a low temperature lower than the normal temperature is made shorter (narrower) than the application time T2 of the holding element Pw at the normal temperature. Thus, it is possible to reduce deviation in the characteristics of the droplet discharge speed for each temperature (installation environment temperature) of the liquid droplets discharged from the head 1. The above method does not have to insert the residual vibration drive waveform after the common drive waveform Vcom so that it is possible to drive the head 1 at a higher drive frequency.

In the common drive waveform Vcom illustrated in FIG. 8A, a center (central time) of the common drive waveform Vcom is matched at each temperature regardless of the installation environment temperature, but the present embodiment is not limited the above configuration. For example, as illustrated in FIG. 8B, the starting times of the contraction elements V2 of the common drive waveform Vcom may be matched at each installation environment temperature.

The head drive controller 400 (circuitry) is configured to: apply a first drive signal to the pressure generator in response to the head temperature being higher than a predetermined 5 temperature (high temperature in FIG. 8A); apply a second drive signal to the pressure generator in response to the head temperature being equal to the predetermined temperature (normal temperature in FIG. 8A); and apply a third drive signal to the pressure generator in response to the head temperature being lower than a predetermined temperature (low temperature in FIG. 8A).

In FIG. 8A, a time of a center of the holding element Pw of each of the first drive signal, the second drive signal, and the third drive signal is identical to each other, an application time of the holding element Pw of each of the first drive signal, the second drive signal, and the third drive signal is different from each other, and a voltage of the holding element Pw of each of the first drive signal, the second drive signal, and the third drive signal 5 is identical to each other.

In FIG. 8B, a time of a start of the contraction element V2 of each of the first drive signal, the second drive signal, and the third drive signal is identical to each other, an application time of the holding element Pw of each of the first drive signal, the second drive signal, and the third drive signal is different from each other, and a voltage of the holding element Pw of each of the first drive signal, the second drive signal, and the third drive signal is identical to each other.

In the common drive waveform Vcom illustrated in FIG. 8A, the voltages of the holding elements Pw of the common drive waveforms Vcom at each installation environmental temperature are made equal to each other, but the present invention is not limited to the above configuration. For example, as illustrated in FIG. 8C, the voltages (intermediate potentials) of the expansion elements V1 and the contraction elements V2 of the common drive waveform Vcom may be matched at each installation environment temperature.

In FIG. 8C, a time of a start of the contraction element V2 of each of the first drive signal, the second drive signal, and the third drive signal is identical to each other, an application time of the holding element Pw of each of the first drive signal, the second drive signal, and the third drive signal is different from each other, voltages of the expansion element V1 and the contraction element V2 of each of the first drive signal, the second drive signal, and the third drive signal are identical to each other, and a voltage of the holding element Pw of each of the first drive signal, the second drive signal, and the third drive signal is different from each other.

As described above, the printer 500 of the first embodiment can suppress the residual vibration of the nozzle meniscus of the head 1 without inserting the residual vibration drive waveform after the common drive waveform Vcom. As a result, the printer 500 (liquid discharge apparatus) can suppress the residual vibration occurred after a liquid discharge process without impairing high-frequency driving of the head 1. The behavior of the residual vibration varies depending on the viscosity of the discharged liquid or the installation environment temperature. Thus, the printer 500 can drive the head 1 at a higher drive frequency.

Embodiment 1

Figure 12:
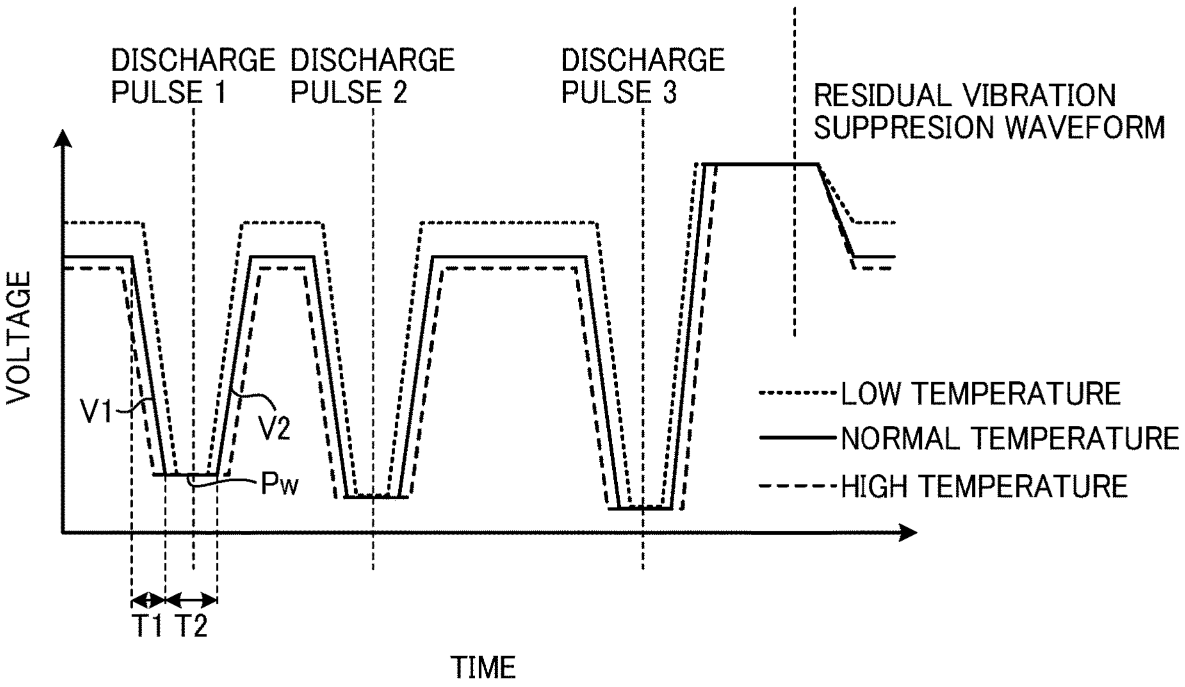
FIG. 12 is a waveform diagram illustrating another example of the common drive waveform Vcom applied to the piezoelectric element in the printer according to an embodiment 1.

FIG. 12 is a waveform diagram illustrating another example of the common drive waveform Vcom applied to the piezoelectric element 42 in the printer 500 according to the embodiment 1.

In FIG. 12, the vertical axis represents the application voltage applied to the piezoelectric element 42, and the horizontal axis represents time. Next, another example of the common drive waveform Vcom applied to the piezoelectric element 42 in the printer 500 according to the present embodiment is described below with reference to FIG. 12.

In the above-described example, the common drive waveform Vcom including a single discharge pulse (drive pulse) has been described. Similarly, it is also possible to control each of multiple discharge pulses in the common drive waveform Vcom including multiple discharge pulses such as a large droplet waveform having a multi-pulse configuration as illustrated in FIG. 12. Specifically, the sum of the application time T1 of the expansion element V1 and the application time T2 of the holding element Pw of each discharge pulses included in the common drive waveform Vcom is made shorter than one half (½) of the natural period of the pressure chamber 21 at the low temperature lower than the natural temperature as illustrated in FIG. 12.

Conversely, the sum of the application time T1 of the expansion element V1 and the application time T2 of the holding element Pw of each discharge pulses included in the common drive waveform Vcom is made longer than one half (½) of the natural period of the pressure chamber 21 at the high temperature higher than the natural temperature as illustrated in FIG. 12.

Thus, it is possible to reduce deviation in the characteristics of the droplet discharge speed for each installation environment temperature of the head 1 as similarly with the common drive waveform Vcom including a single discharge pulse. As a result, it is not necessary to insert the residual vibration drive waveform after the common drive waveform Vcom so that the head 1 can be driven at a higher drive frequency.

In a large droplet waveform or the like having a multi-pulse configuration, it is insufficient to provide the residual vibration suppression waveform at the final portion of the common drive waveform Vcom to obtain an effect of suppressing the residual vibration. According to the above method, it is possible to suppress the fluctuation of the droplet discharge speed for each discharge pulse and to prevent an increase in a waveform length.

Embodiment 2

Figure 13A:
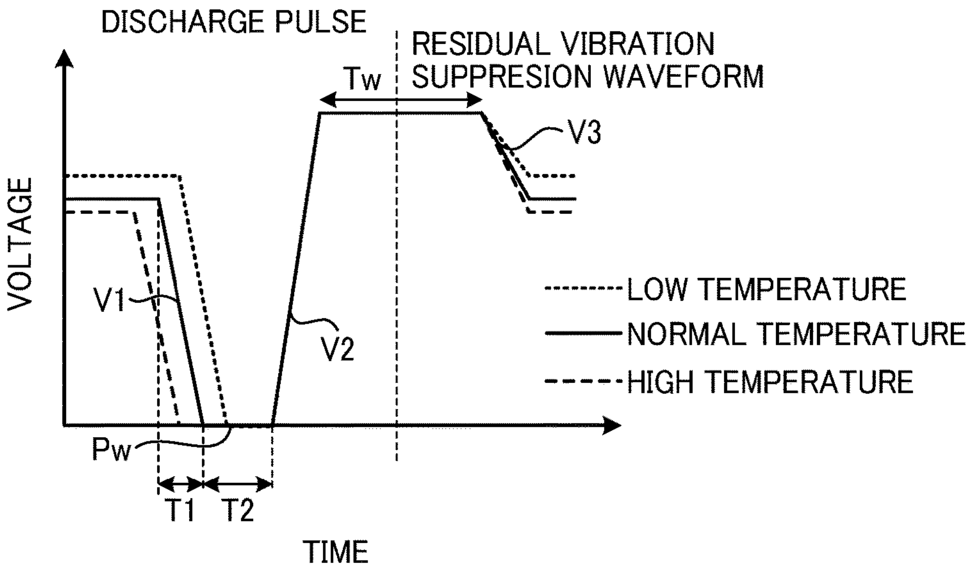
FIGS. 13A to 13C are waveform diagrams illustrating still another example of the 5 common drive waveform Vcom applied to the piezoelectric element in the printer according to an embodiment 2.
Figure 13B:
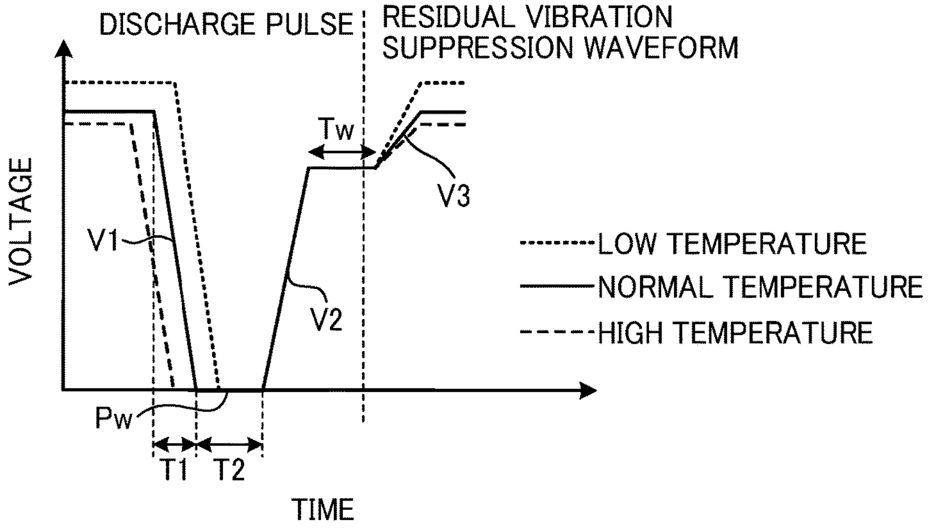
Figure 13C:
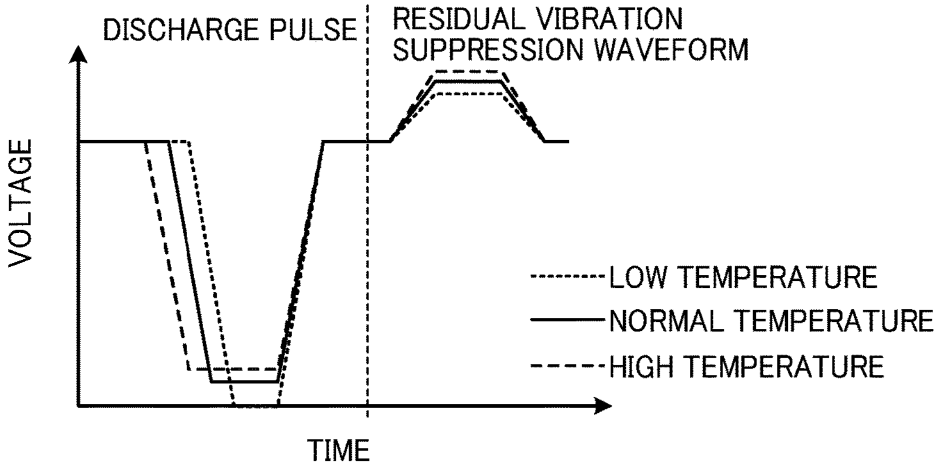

FIGS. 13A to 13C are waveform diagrams illustrating still another example of the common drive waveform Vcom applied to the piezoelectric element 42 in the printer 500 according to the embodiment 2. In FIGS. 13A to 13C, the vertical axis represents the application voltage applied to the piezoelectric element 42, and the horizontal axis represents time.

Figure 14:
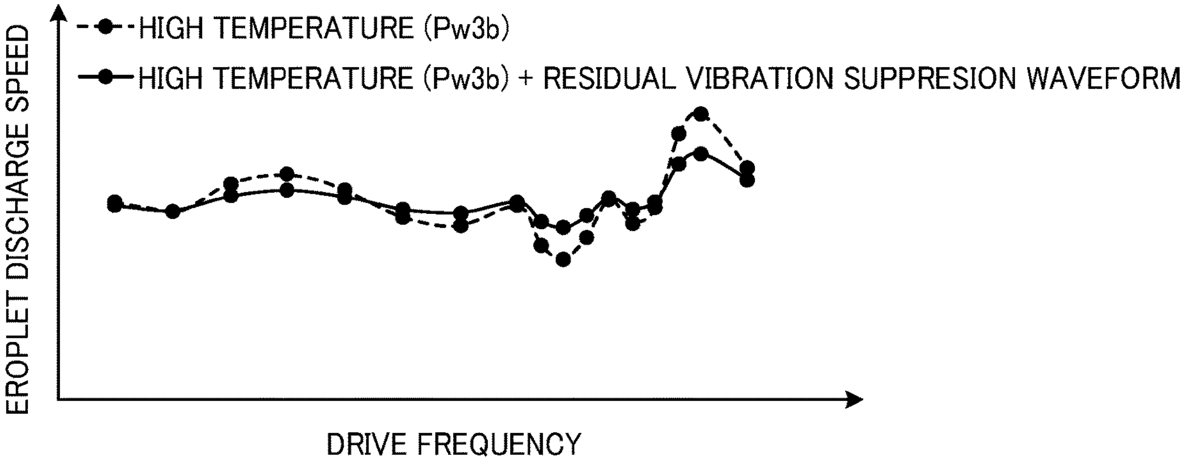
FIG. 14 is a graph illustrating an example of a relationship between the droplet discharge speed and the drive frequency in the embodiment 2.

FIG. 14 is a graph illustrating an example of the relationship between the droplet discharge speed and the drive frequency in the embodiment 2. In FIG. 14, the vertical axis 5 represents the droplet discharge speed, and the horizontal axis represents the drive frequency.

Specifically, the sum of the application time T1 of the expansion element V1 and the application time T2 of the holding element Pw is made shorter than one half (½) of the natural period of the pressure chamber 21 at the low temperature lower than the natural temperature in the common drive waveform Vcom according to the embodiment 2 as illustrated in FIG. 13A to 13C.

Specifically, the sum of the application time T1 of the expansion element V1 and the application time T2 of the holding element Pw is made longer than one half (½) of the natural period of the pressure chamber 21 when the installation environment temperature is higher than natural temperature in the common drive waveform Vcom according to the embodiment 2 as illustrated in FIG. 13A to 13C. Further, the common drive waveform Vcom has a residual vibration suppression waveform Tw that suppresses residual vibration of nozzle meniscus occurred after the liquid is discharged from the nozzle 11 of the head 1 in the embodiment 2 as illustrated in FIGS. 13A to 13C. The residual vibration suppression waveform Tw is disposed after the contraction element V2. The residual vibration suppression waveform Tw is an example of a residual vibration suppression element.

For example, the application time T2 of the holding element Pw included in the common drive waveform Vcom is set to the pulse width Pw3*b* (see FIG. 11A) in a high-temperature environment as illustrated in FIG. 13A. Then, it is possible to suppress a decrease in the droplet discharge peed as a whole although the vibration of the natural period of the pressure chamber 21 may remain on the high frequency side. In this case, the residual vibration suppression waveform Tw is added after the contraction element V2 when there is a margin in a wavelength of the common drive waveform Vcom as illustrated in FIGS. 13A to 13C. Thus, it is possible to suppress influence of the variation in the drive frequency to the droplet discharge speed as illustrated in FIG. 14.

Second Embodiment

The printer 500 according to the present embodiment is an example that includes a head in which nozzles are arranged in a two dimensional matrix. Redundant descriptions of the same matters as those described above in the first embodiment may be omitted below.

Next, a printer 500 as a liquid discharge apparatus according to a second embodiment is described below with reference to FIGS. 15 and 16.

Figure 15:
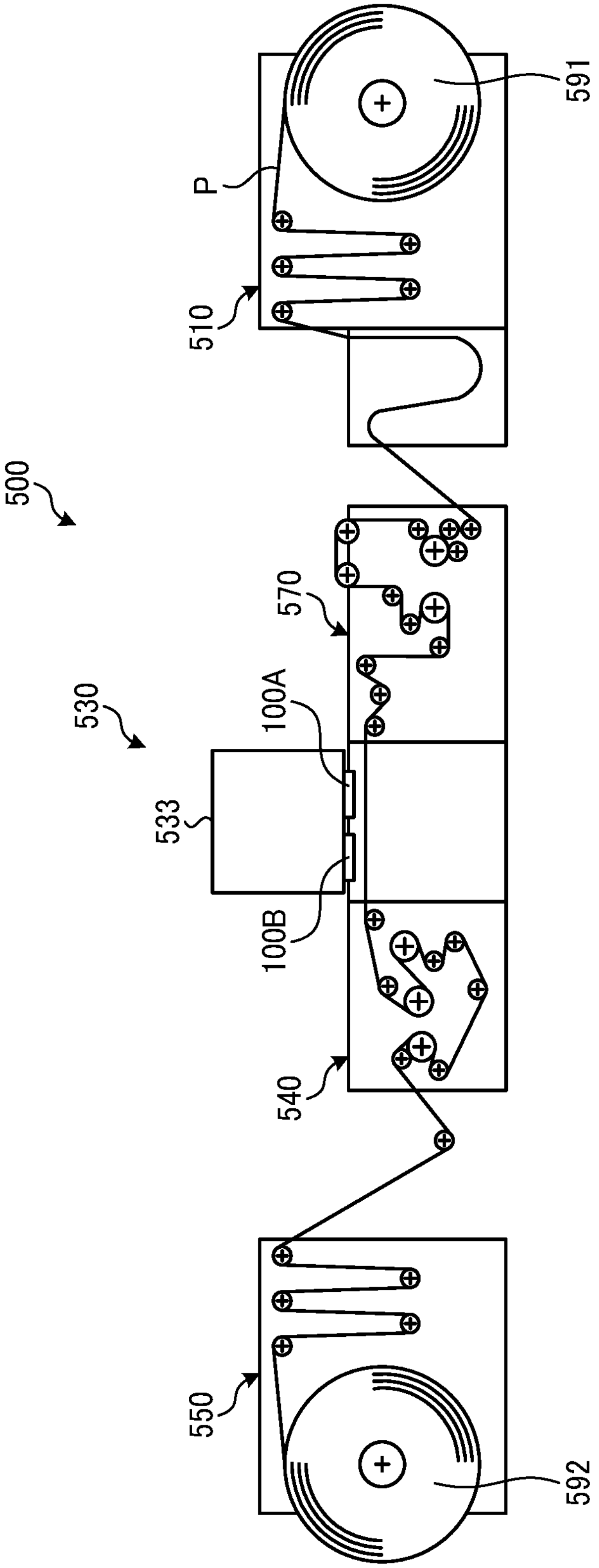
FIG. 15 is a schematic side view of a printer according to a second embodiment of the present disclosure.

FIG. 15 is a schematic side view of a printer 500 according to a second embodiment of the present disclosure.

Figure 16:
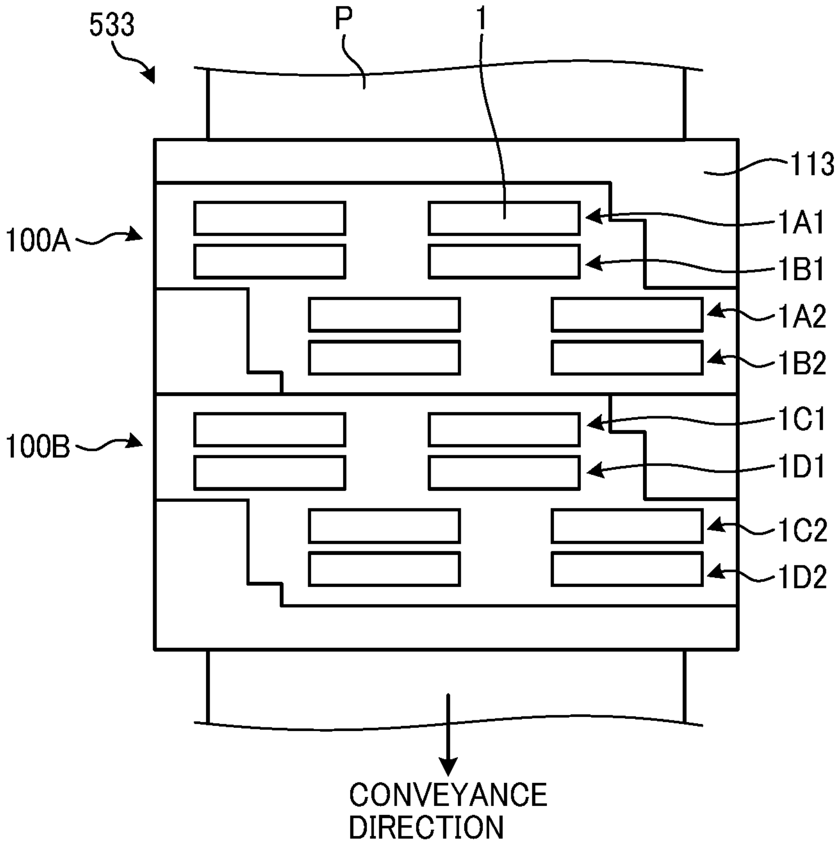
FIG. 16 is a schematic plan view of a discharge unit of the printer according to the second embodiment.

FIG. 16 is a schematic plan view of a discharge unit 533 of the printer 500.

A printer 500 according to the present embodiment includes a loading unit 510, a guide conveyor 570, a printing unit 530, a drying unit 540, and an ejection unit 550. The loading unit 510 feeds a sheet P such as a continuous body, rolled sheet, and a web. The guide conveyor 570 guides and conveys the sheet P fed from the loading unit 510, to the printing unit 530. The printing unit 530 discharges a liquid onto the sheet P to print an image on the sheet P. The drying unit 540 dries the sheet P. The ejection unit 509 ejects the sheet P.

The sheet P is fed from a winding roller 591 of the loading unit 510, guided and conveyed with rollers of the loading unit 510, the guide conveyor 570, the drying unit 540, and the ejection unit 550, and wound around a winding roller 592 of the ejection unit 550.

In the printing unit 530, the sheet P is conveyed opposite the discharge unit 533. The discharge unit 533 discharges a liquid from the nozzles 11 of the heads 1 to form an image on the sheet P.

Here, the discharge unit 533 includes two head modules 100 (100A and 100B) on a common base member 113 (see FIG. 2).

As illustrated in FIG. 16, the head module 100A includes head arrays 1A1, 1B1, 1A2, and 1B2. Each of the head arrays 1A1, 1B1, 1A2, and 1B2 includes multiple heads 1 arranged in a head array direction perpendicular to a conveyance direction of the sheet P as indicated by arrow in FIG. 16. The head module 100B includes head arrays 1C1, 1D1, 1C2, and 1D2. Each of the head arrays 1C1, 1D1, 1C2, and 1D2 includes multiple heads 1 arranged in the head array direction perpendicular to the conveyance direction of the sheet P. The multiple heads 1 in each of the head arrays 1A1 and 1A2 of the head module 100A discharge liquid of the same desired color.

Similarly, the head arrays 1B1 and 1B2 of the head module 100A are grouped as one set that discharge liquid of the same desired color. The head arrays 1C1 and 1C2 of the head module 100B are grouped as one set that discharge liquid of the same desired color. The 5 head arrays 1D1 and 1D2 of the head module 100B are grouped as one set to discharge liquid of the same desired color.

Figure 17:
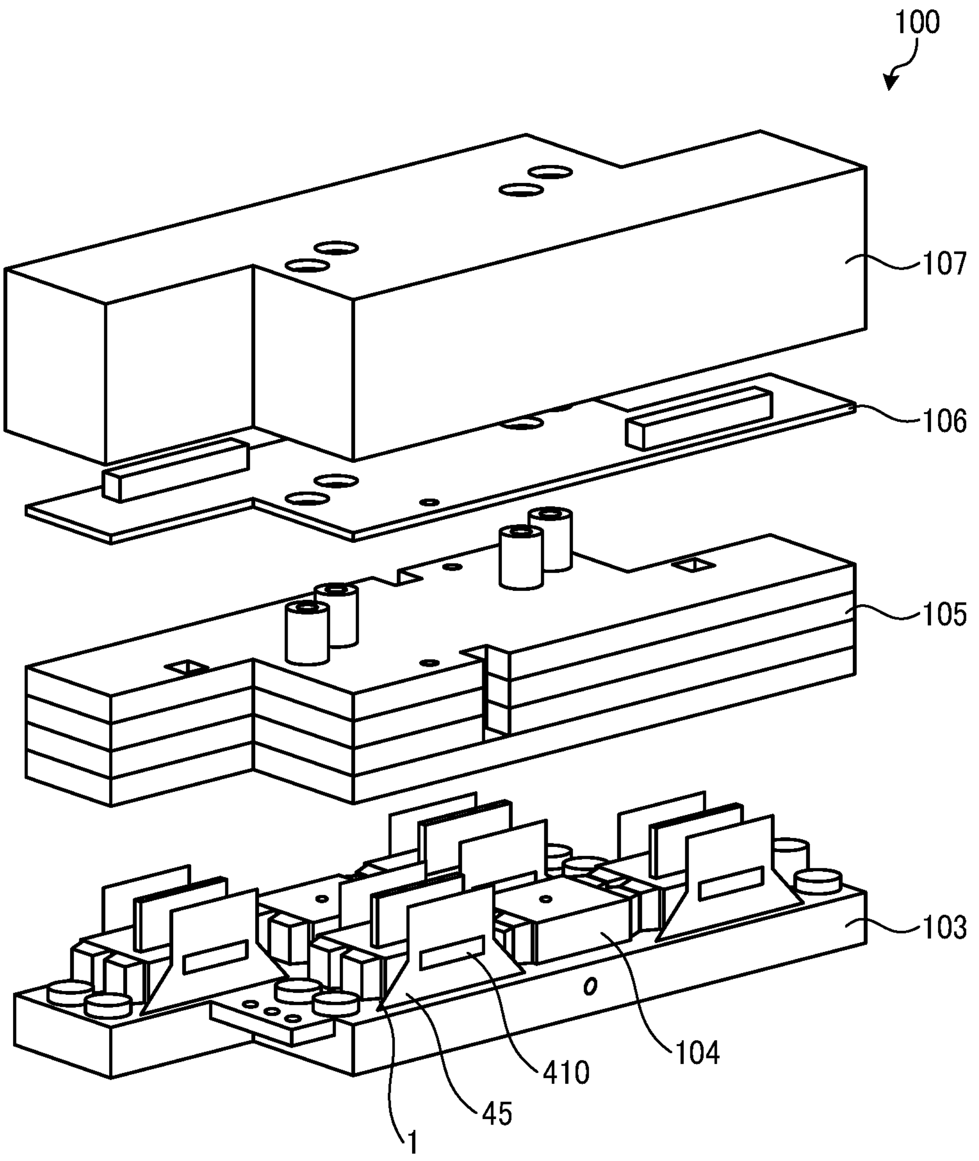
FIG. 17 is an exploded perspective view of a head module in the printer according to the second embodiment.

FIG. 17 is an exploded perspective view of a head module 100 in the printer 500 according to the second embodiment.

Figure 18:
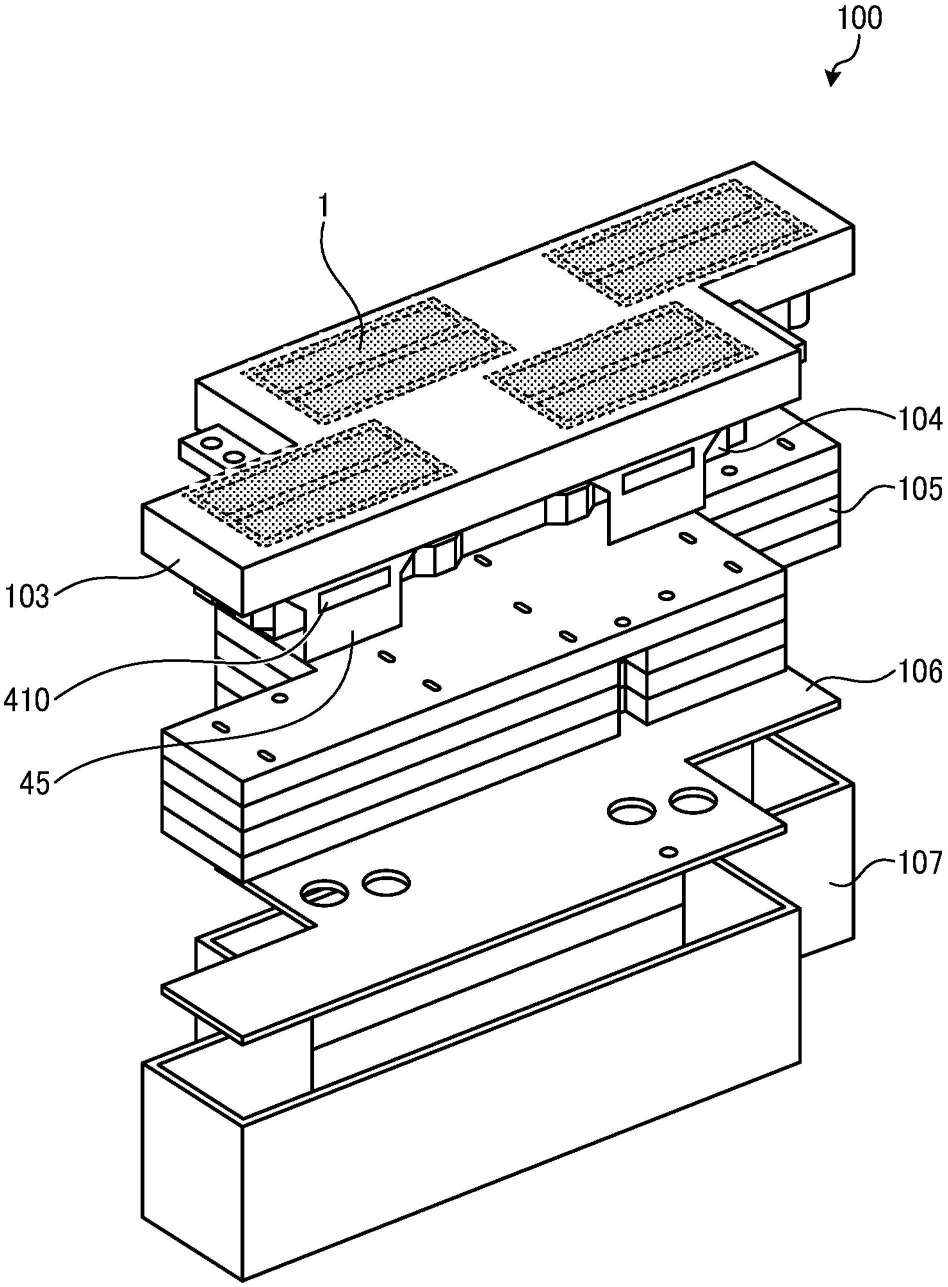
FIG. 18 is an exploded perspective view of the head module in the printer according to the second embodiment as viewed from a nozzle surface side.

FIG. 18 is an exploded perspective view of the head module 100 in the printer 500 according to the second embodiment as viewed from the nozzle surface side. Next, an example of the head module 100 according to the present embodiment is described with reference to FIGS. 17 and 18.

The head module 100 includes multiple heads 1 that are liquid discharge heads to discharge liquid, and the base 103 that holds the multiple heads 1.

In addition, the head module 100 includes a heat dissipation member 104, a manifold 105 forming channels to supply liquid to the multiple heads 1, a printed circuit board 106 (PCB) coupled to a flexible wiring board 45 (see FIG. 19), and a module case 107.

Figure 19:
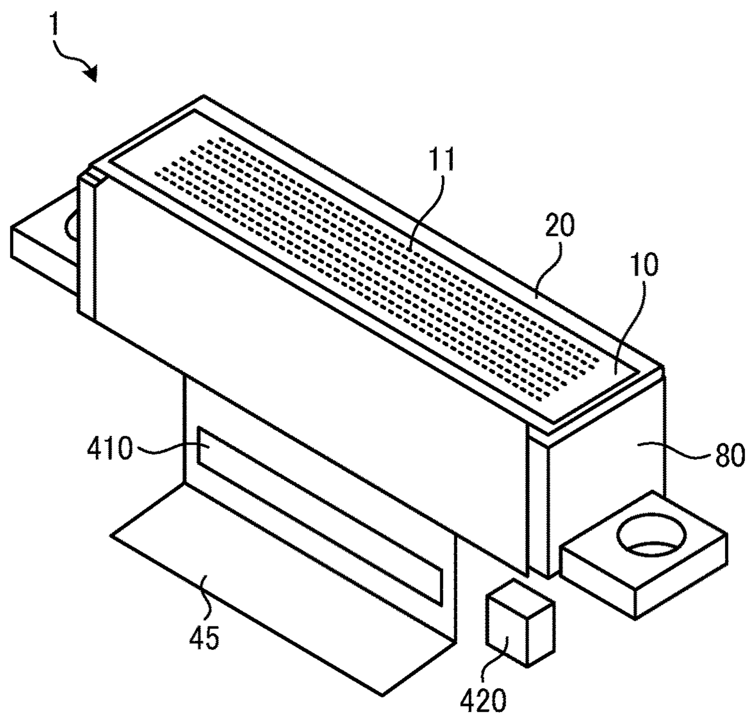
FIG. 19 is an external perspective view of a liquid discharge head in the printer according to the second embodiment viewed from the nozzle surface side.

FIG. 19 is an external perspective view of the head 1 in the printer 500 according to the second embodiment viewed from the nozzle surface side.

Figure 20:
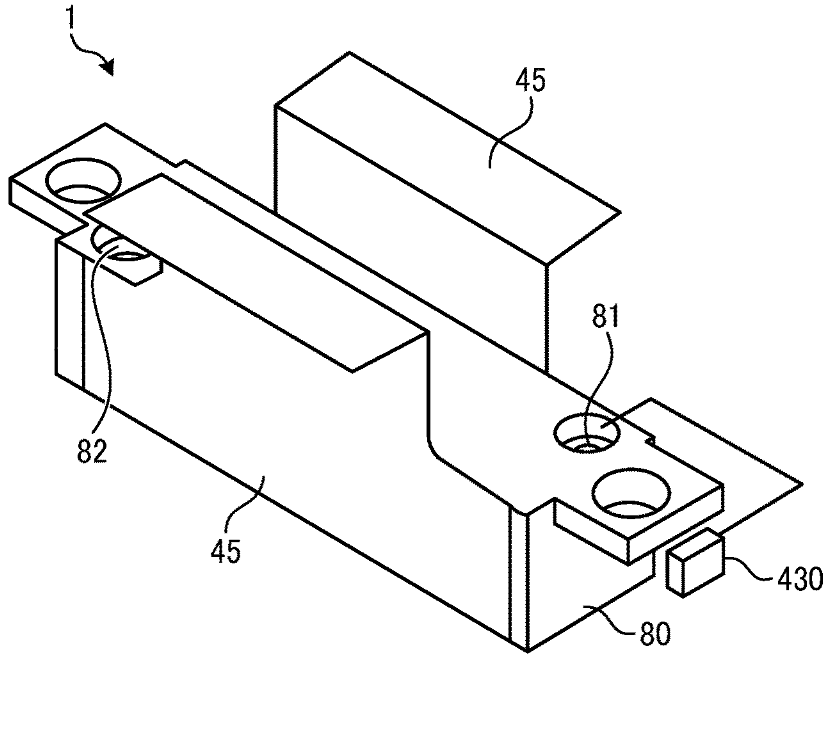
FIG. 20 is an external perspective view of the liquid discharge head in the printer according to the second embodiment as viewed from a side opposite to the nozzle surface.

FIG. 20 is an external perspective view of the head 1 in the printer 500 according to the second embodiment as viewed from the side opposite to the nozzle surface.

Figure 21:
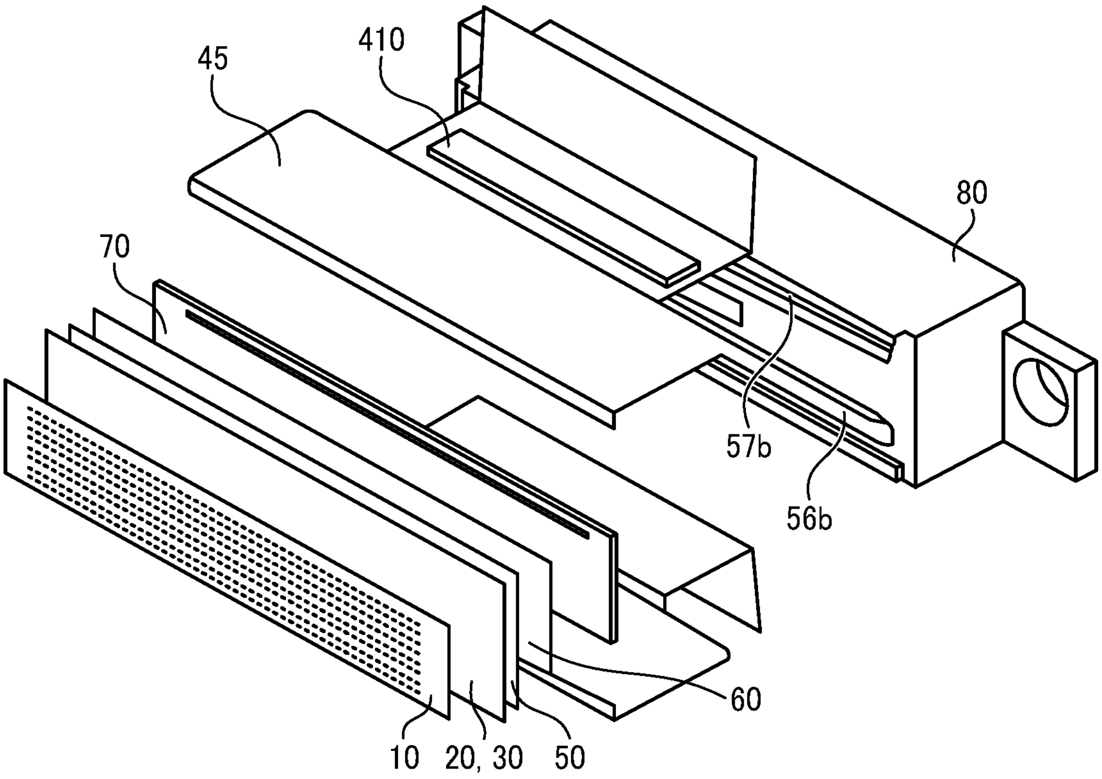
FIG. 21 is an exploded perspective view of the liquid discharge head in the printer according to the second embodiment.

FIG. 21 is an exploded perspective view of the head 1 in the printer 500 according to the second embodiment.

Figure 22:
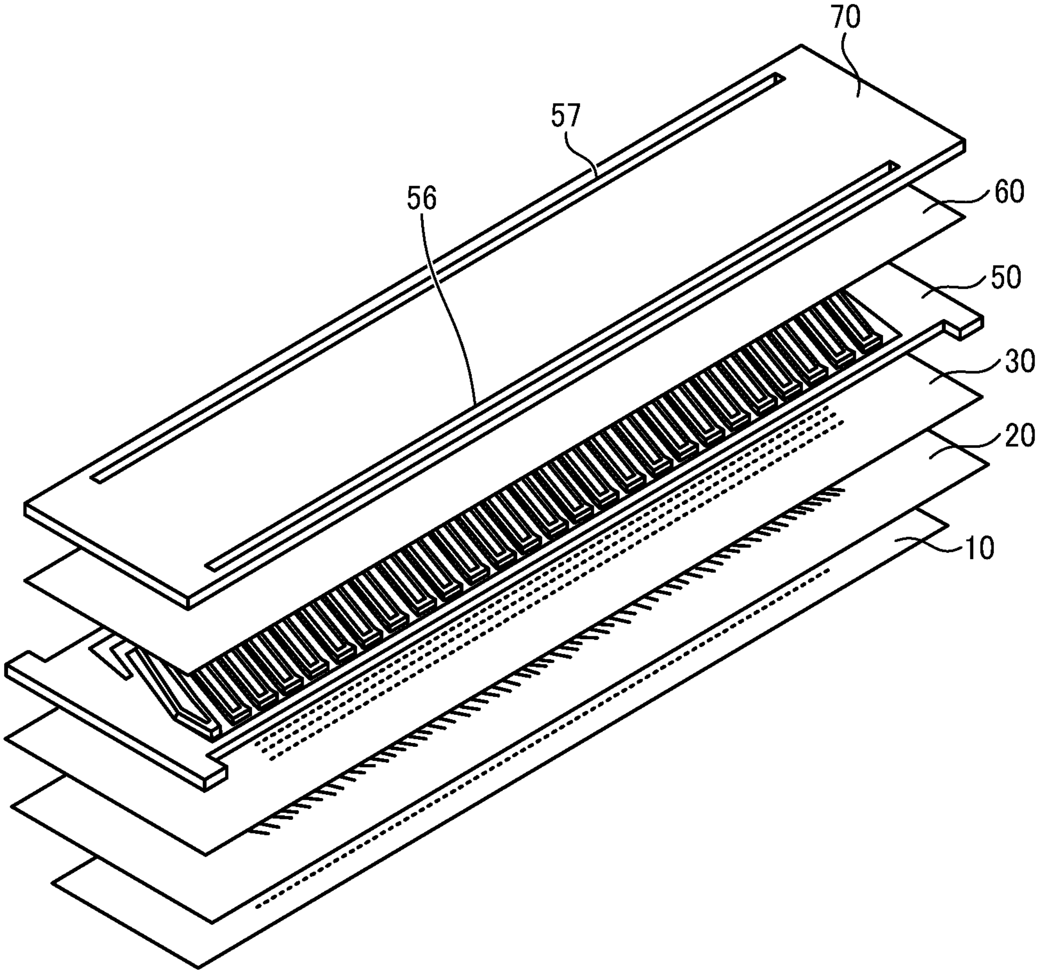
FIG. 22 is an exploded perspective view of a channel forming member of the liquid discharge head in the printer according to the second embodiment.

FIG. 22 is an exploded perspective view of a channel forming member of the head 1 in the printer 500 according to the second embodiment.

Figure 23:
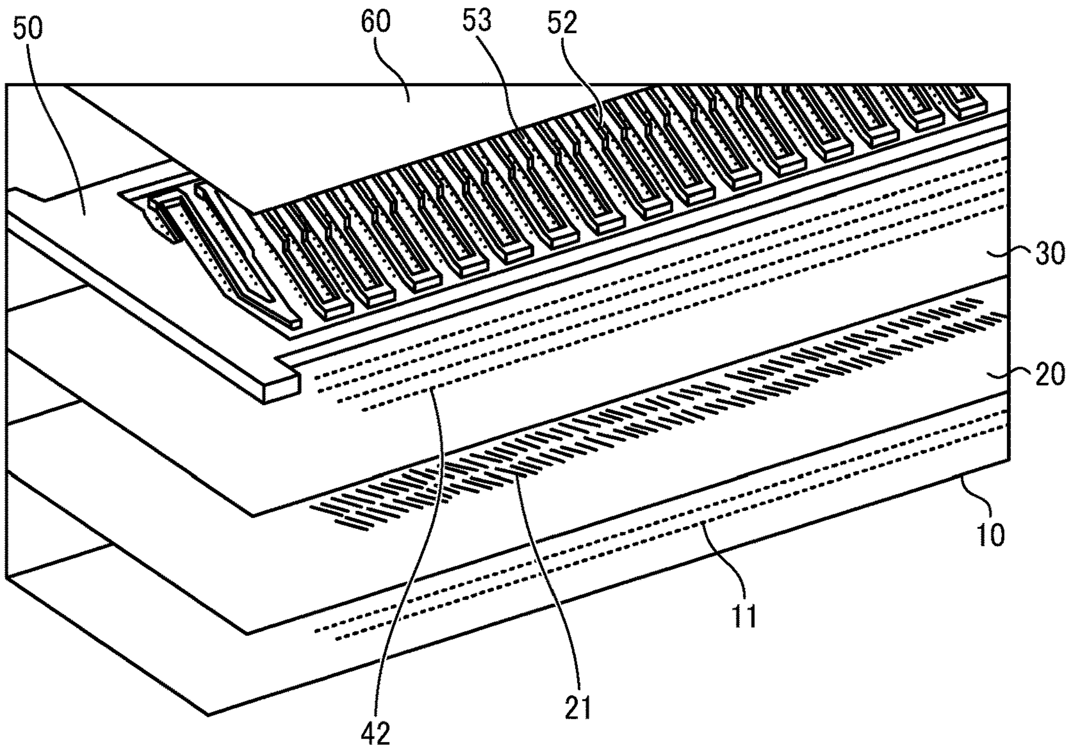
FIG. 23 is an enlarged perspective view of a main part of the liquid discharge head according to the second embodiment.

FIG. 23 is an enlarged perspective view of a main part of the head 1 according to the second embodiment.

Figure 24:
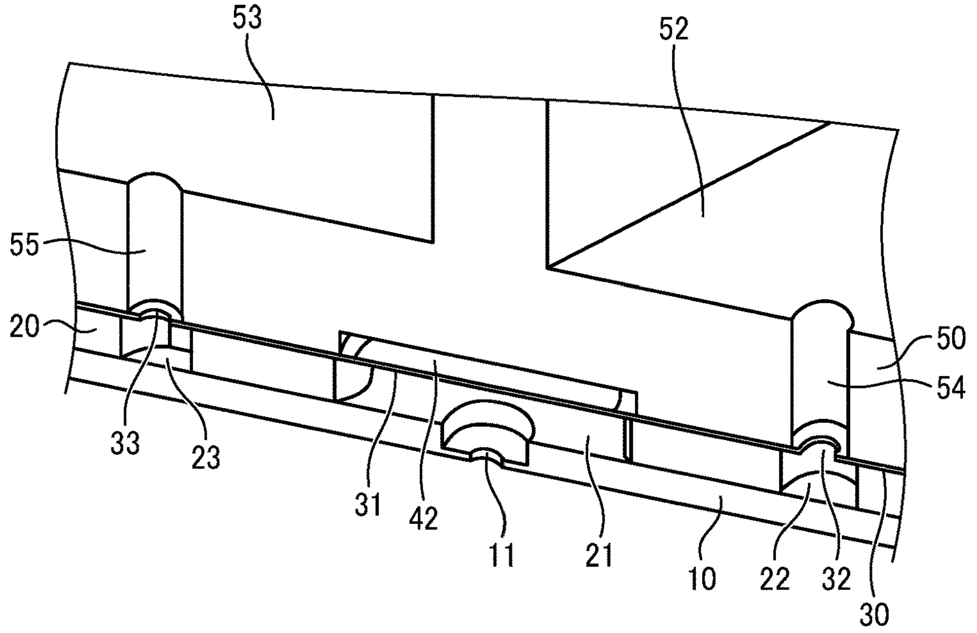
FIG. 24 is a cross-sectional perspective view of a channel portion of the liquid discharge head according to the second embodiment.

FIG. 24 is a cross-sectional perspective view of a channel portion of the head 1 according to the second embodiment.

Next, an example of the head 1 in the printer 500 according to the present embodiment is described below with reference to FIGS. 19 to 24.

The head 1 includes a nozzle plate 10, an individual channel plate 20 (channel member), a diaphragm member 30, a common channel member 50, a damper 60, a common channel member 70, a frame 80, a flexible wiring board 45 (wiring), and the like. A head driver 410 (driver IC) is mounted on the flexible wiring board 45 (wiring).

The nozzle plate 10 includes multiple nozzles 11 to discharge a liquid. The multiple nozzles 11 are arranged in a two-dimensional matrix.

The individual channel member (channel plate 20) includes multiple pressure 5 chambers 21 (individual chambers) respectively communicating with the multiple nozzles

11, multiple individual supply channels 22 respectively communicating with the multiple pressure chambers 21, and multiple individual collection channels 23 respectively communicating with the multiple pressure chambers 21 (see FIGS. 23 and 24). One pressure chamber 21, and the individual supply channel 22 and the individual collection channel 23 communicating with the pressure chamber 21 are collectively referred to as an individual channel 25.

The diaphragm member 30 forms a diaphragm 31 serving as a deformable wall of the pressure chamber 21, and the piezoelectric element 42 is formed on the diaphragm 31 so that the piezoelectric element 42 and the diaphragm 31 form a single body (see FIG. 24). Further, the diaphragm member 30 includes a supply opening 32 that communicates with the 5 individual supply channel 22 and a collection opening 33 that communicates with the individual collection channel 23 (see FIG. 24). The piezoelectric element 42 is a pressure generator that deforms the diaphragm 31 to apply pressure on a liquid in the pressure chamber 21.

Note that the individual channel member (channel plate 20) and the diaphragm member 30 are not limited to be separate members. For example, the individual channel member (channel plate 20) and the diaphragm member 30 may be formed by a single member using a Silicon on Insulator (SOI) substrate. That is, an SOI substrate in which a silicon oxide film, a silicon layer, and a silicon oxide film are formed in this order on a silicon substrate can be used. The silicon substrate forms the individual channel member 20, and the silicon oxide film, the silicon layer, and the silicon oxide film in the SOI substrate form the diaphragm 31. In such a configuration, the layer structure of the silicon oxide film, the silicon layer, and the silicon oxide film in the SOI substrate forms the diaphragm member 30. Thus, the diaphragm member 30 may be formed by materials formed as films on a surface of the individual channel member 20.

The common channel member 50 includes multiple common-supply branch channels 52 that communicate with two or more individual supply channels 22 and a multiple common-collection branch channels 53 that communicate with two or more individual collection channels 23. The multiple common-supply branch channels 52 and the multiple common-collection branch channels 53 are arranged alternately adjacent to each other. The common channel member 50 is a common branch channel member.

As illustrated in FIG. 24, the common channel member 50 includes a through hole serving as a supply port 54 that connects the supply opening 32 of the individual supply channel 22 and the common-supply branch channel 52, and a through hole serving as a collection port 55 that connects the collection opening 33 of the individual collection channel 23 and the common-collection branch channel 53.

The common channel member 50 includes one or more common-supply main channels 56 (see FIG. 22) communicating with the multiple common-supply branch channels 52 (see FIG. 23), and one or more common-collection main channels 57 (see FIG. 22) communicating with the multiple common-collection branch channels 53 (see FIG. 23). The common channel member 50 includes a part **56*b* as a part of the common-supply main channels 56, and a part 57*b* as a part of the common-collection main channels 57 (see FIG. 21**).

The damper 60 (see FIG. 23) includes a supply-side damper that faces (opposes) the supply port 54 of the common-supply branch channel 52 and a collection-side damper that 5 faces (opposes) the collection port 55 of the common-collection branch channel 53.

As illustrated in FIG. 23, the damper 60 seals grooves alternately arrayed in the same common channel member 50 to form the common-supply branch channels 52 and the common-collection branch channels 53. Thus, the damper 60 forms a deformable wall of the common-supply branch channels 52 and the common-collection branch channels 53.

The common channel member 70 includes the common-supply main channel 56 (see FIG. 22) that communicates with the multiple common-supply branch channels 52 (see FIG. 23) and the common-collection main channel 57 (see FIG. 22) that communicate with the multiple common-collection branch channels 53 (see FIG. 23). The common channel member 70 is a common main channel member.

The frame 80 includes the part **56*b* of the common-supply main channel 56 and the part 57*b* of the common-collection main channel 57 (see FIG. 21). The part 56*b* of the common-supply main channel 56 communicates with the supply port 81 (see FIG. 20) in the frame 80. The part 57*b* of the common-collection main channel 57 communicates with the collection port 82 (see FIG. 20) in the frame 80**.

In the head 1, the liquid is supplied from the common-supply main channel 56 (see FIG. 22), flowing through the common-supply branch channel 52 (see FIG. 23) and the supply port 54 to the pressure chamber 21 (see FIG. 24), and is discharged from the nozzle 11 (see FIG. 24). The liquid not discharged from the nozzle 11 is collected from the collection port 55 (see FIG. 24), flowing through the common-collection branch channel 53 (see FIG. 24) to the common-collection main channel 57 (see FIG. 22), and is discharged outside the head 1 from the collection port 82 (see FIG. 20) to an external circulation device, and is supplied again to the common-supply main channel 56 through the supply port 81 (see FIG. 20).

As described above, the head drive controller according to the first embodiment can 5 also be applied to a printer including the head 1 in which the nozzles 11 are arranged in a two dimensional matrix.

In the present embodiments, a "liquid" dischargeable from the head is not particularly limited as long as the liquid has a viscosity and surface tension of degrees dischargeable from the head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid on materials to which liquid can adhere, but also apparatuses to discharge a liquid toward gas or into a liquid.

The "liquid discharge apparatus" may include devices to feed, convey, and eject the material on which liquid can adhere.

The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a 5 material on which liquid is at least temporarily adhered, a material on which liquid is adhered and fixed, or a material into which liquid is adhered to permeate.

Examples of the "material on which liquid can adhere" include recording media such as a paper sheet, recording paper, and a recording sheet of paper, film, and cloth, electronic components such as an electronic substrate and a piezoelectric element, and media such as a powder layer, an organ model, and a testing cell.

The "material on which liquid can adhere" includes any material on which liquid adheres unless particularly limited.

Examples of the "material onto which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material on which liquid can adhere.

However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on the surface of the sheet to reform the sheet surface and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

[Aspect 1]

A liquid discharge apparatus (500) includes: a liquid discharge head (1) configured to discharge a liquid from a nozzle, the liquid discharge head includes: a liquid chamber (21) communicating with the nozzle; a pressure generator (piezoelectric element 42) configured to deform the liquid chamber to apply pressure to the liquid in the liquid chamber; and circuitry (400) configured to apply a drive signal to the pressure generator to drive the pressure generator, the drive signal including at least one drive pulse, wherein the drive pulse includes: an expansion element (V1) configured to expand the liquid chamber to a first volume; a holding element (Pw) configured to hold the first volume of the liquid chamber expanded by the expansion element for a predetermined time; and a contraction element (V2) configured to contract the liquid chamber from the first volume held by the holding element to a second volume, and the circuitry (400) is configured to change a time (T1+T2) from a start of the 5 expansion element (V1) to an end of the holding element (Pw) based on viscosity of the liquid or a head temperature that is a temperature in a vicinity of the liquid discharge head (1).

[Aspect 2]

In the liquid discharge apparatus (500) according to aspect 1, the circuitry (400) changes the time (T1+T2) from the start of the expansion element (V1) to the end of the holding element (Pw) to be longer than one half of a natural period of the liquid chamber in response to the viscosity of the liquid being lower than a predetermined viscosity.

[Aspect 3]

In the liquid discharge apparatus (500) according to aspect 1, the circuitry (400) changes the time (T1+T2) from the start of the expansion element (V1) to the end of the holding element (Pw) to be longer than one half of a natural period of the liquid chamber in response to the apparatus temperature being higher than a predetermined temperature.

[Aspect 4]

In the liquid discharge apparatus (500) according to aspect 1, the circuitry (400) changes the time (T1+T2) from the start of the expansion element (V1) to the end of the holding element (Pw) to be shorter than one half of a natural period of the liquid chamber in response to the viscosity of the liquid being higher than a predetermined viscosity.

[Aspect 5]

In the liquid discharge apparatus (500) according to aspect 1, the circuitry (400) changes the time (T1+T2) from the start of the expansion element (V1) to the end of the holding element (Pw) to be shorter than one half of a natural period of the liquid chamber in response to the head temperature being lower than a predetermined temperature.

[Aspect 6]

In the liquid discharge apparatus (500) according to aspect 1, the circuitry (400) changes the time (T1+T2) from the start of the expansion element (V1) to the end of the holding element (Pw) to be equal to one half of a natural period of the liquid chamber in response to the viscosity of the liquid being equal to a predetermined viscosity.

[Aspect 7]

In the liquid discharge apparatus (500) according to aspect 1, the circuitry (400) changes the time (T1+T2) from the start of the expansion element (V1) to the end of the holding element (Pw) to be equal to one half of a natural period of the liquid chamber in response to temperature in the vicinity of the liquid discharge head being equal to a predetermined temperature.

[Aspect 8]

In the liquid discharge apparatus (500) according to aspect 1, the circuitry (400) changes the time (T1+T2) from the start of the expansion element (V1) to the end of the holding element (Pw) to be longer than one half of a natural period of the liquid chamber in response to the viscosity of the liquid being lower than a predetermined viscosity, and the circuitry (400) changes the time (T1+T2) from the start of the expansion element (V1) to the end of the holding element (Pw) to be shorter than one half of a natural period of the liquid chamber in response to the viscosity of the liquid being higher than the predetermined viscosity.

[Aspect 9]

In the liquid discharge apparatus (500) according to aspect 1, the circuitry (400) changes the time (T1+T2) from the start of the expansion element (V1) to the end of the holding element (Pw) to be longer than one half of a natural period of the liquid chamber in response to temperature in the vicinity of the liquid discharge head being higher than a predetermined temperature, and the circuitry (400) changes the time (T1+T2) from the start of the expansion element (V1) to the end of the holding element (Pw) to be shorter than one half of a natural period of the liquid chamber in response to temperature in the vicinity of the liquid discharge head being lower than a predetermined temperature.

[Aspect 10]

In the liquid discharge apparatus (500) according to aspect 1, the circuitry (400) maintains an application time of the expansion element constant regardless of the viscosity of the liquid or the temperature in the vicinity of the liquid discharge head; and the circuitry (400) changes an application time of the holding element based on the viscosity of the liquid or the temperature in the vicinity of the liquid discharge head (1).

[Aspect 11]

In the liquid discharge apparatus (1) according to aspect 1, the circuitry (400) is configured to apply a residual vibration suppression element (Tw) after the drive pulse, and the residual vibration suppression element (Tw) is to suppress the residual vibration of meniscus of the liquid in the nozzle (11) after the liquid is discharged from the nozzle (11).

[Aspect 12]

The liquid discharge apparatus (1) according to aspect 1, further includes a temperature detector (420) configured to detect temperature in a vicinity of the liquid discharge head (1).

[Aspect 13]

The liquid discharge apparatus (1) according to claim 1, further includes a viscosity detector (430) configured to detect viscosity of the liquid to be supplied to the liquid 5 discharge head (1).

[Aspect 14]

In the liquid discharge apparatus (1) according to aspect 1, the circuitry is configured to: apply a first drive signal to the pressure generator in response to the head temperature being higher than a predetermined temperature; apply a second drive signal to the pressure generator in response to the head temperature being equal to the predetermined temperature; and apply a third drive signal to the pressure generator in response to the head temperature being lower than a predetermined temperature, and a time of a center of the holding element (Pw) of each of the first drive signal, the second drive signal, and the third drive signal is identical to each other, an application time of the holding element (Pw) of each of the first 5 drive signal, the second drive signal, and the third drive signal is different from each other, and a voltage of the holding element (Pw) of each of the first drive signal, the second drive signal, and the third drive signal is identical to each other.

[Aspect 15]

In the liquid discharge apparatus (1) according to aspect 1, the circuitry is configured to: apply a first drive signal to the pressure generator in response to the head temperature being higher than a predetermined temperature; apply a second drive signal to the pressure generator in response to the head temperature being equal to the predetermined temperature; and apply a third drive signal to the pressure generator in response to the head temperature being lower than a predetermined temperature, and a time of a start of the contraction element (V2) of each of the first drive signal, the second drive signal, and the third drive signal is identical to each other, an application time of the holding element (Pw) of each of the first drive signal, the second drive signal, and the third drive signal is different from each other, and a voltage of the holding element (Pw) of each of the first drive signal, the second drive signal, and the third drive signal is identical to each other.

[Aspect 16]

In the liquid discharge apparatus (1) according to aspect 1, the circuitry is configured to: apply a first drive signal to the pressure generator in response to the head temperature being higher than a predetermined temperature; apply a second drive signal to the pressure generator in response to the head temperature being equal to the predetermined temperature; and apply a third drive signal to the pressure generator in response to the head temperature being lower than a predetermined temperature, and a time of a start of the contraction element (V2) of each of the first drive signal, the second drive signal, and the third drive signal is identical to each other, an application time of the holding element (Pw) of each of the first drive signal, the second drive signal, and the third drive signal is different from each other, voltages of the expansion element (V1) and the contraction element (V2) of each of the first drive signal, the second drive signal, and the third drive signal are identical to each other, and a voltage of the holding element (Pw) of each of the first drive signal, the second drive signal, and the third drive signal is different from each other.

[Aspect 17]

A head drive controller (400) includes: circuitry (400) configured to apply a drive signal to a liquid discharge head to drive the liquid discharge head to discharge a liquid, the drive signal including at least one drive pulse, wherein the drive pulse includes: an expansion element (V1) to expand a liquid chamber in the liquid discharge head to a first volume; a holding element (Pw) to hold the first volume of the liquid chamber expanded by the 5 expansion element for a predetermined time; and a contraction element (V2) to contract the liquid chamber from the first volume held by the holding element to a second volume, and the circuitry (400) is configured to change a time (T1+T2) from a start of the expansion element (V1) to an end of the holding element (Pw) based on at least one of viscosity of the liquid or a head temperature that is a temperature in a vicinity of the liquid discharge head (1).

[Aspect 18]

A liquid discharge method includes: applying a drive signal to a liquid discharge head (1) to drive the liquid discharge head (1) to discharge a liquid, the drive signal including at least one drive pulse, wherein the applying includes: expanding a liquid chamber in the liquid discharge head (1) to a first volume by an expansion element (V1); holding the first volume of the liquid chamber expanded by the expansion element for a predetermined time by a holding element (Pw); and contracting the liquid chamber from the first volume held by the holding element to a second volume by a contraction element (V2), and changing a time (T1+T2) from a start of the expansion element (V1) to an end of the holding element (Pw) based on at least one of viscosity of the liquid or a head temperature that is a temperature in a vicinity of the liquid discharge head (1).

According to the above-described present embodiments, it is possible to reduce residual vibration after the liquid discharge process having different behaviors depending on viscosity of a discharge liquid or an installation environment temperature without impairing the high-frequency driving of the liquid discharge head.

The functionality of the elements disclosed herein such as the head drive controller 400 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a liquid discharge head configured to discharge a liquid from a nozzle, the liquid discharge head comprising:

a liquid chamber communicating with the nozzle;

a pressure generator configured to deform the liquid chamber to apply pressure to the liquid in the liquid chamber; and circuitry configured to apply a drive signal to the pressure generator to drive the pressure generator, the drive signal including at least one drive pulse, wherein the drive pulse includes:

an expansion element to expand the liquid chamber to a first volume;

a holding element to hold the first volume of the liquid chamber expanded by the expansion element for a predetermined time; and a contraction element to contract the liquid chamber from the first volume held by the holding element to a second volume, and the circuitry is configured to change a time from a start of the expansion element to an end of the holding element based on viscosity of the liquid or a head temperature that is a temperature in a vicinity of the liquid discharge head, wherein the circuitry is configured to change the time from the start of the expansion element to the end of the holding element to be longer than one half of a natural period of the liquid chamber in response to the head temperature being higher than a predetermined temperature.

2. The liquid discharge apparatus according to claim 1, wherein the circuitry is configured to change the time from the start of the expansion element to the end of the holding element to be shorter than one half of the natural period of the liquid chamber in response to the head temperature being lower than the predetermined temperature.

3. The liquid discharge apparatus according to claim 1, wherein the circuitry is configured to change the time from the start of the expansion element to the end of the holding element to be equal to one half of the natural period of the liquid chamber in response to the head temperature being equal to the predetermined temperature.

4. The liquid discharge apparatus according to claim 1, wherein the circuitry is configured to maintain an application time of the expansion element constant regardless of the viscosity of the liquid or the head temperature; and the circuitry is configured to change an application time of the holding element based on the viscosity of the liquid or the head temperature.

5. The liquid discharge apparatus according to claim 1, wherein the circuitry is configured to apply a residual vibration suppression element after the drive pulse, and the residual vibration suppression element is to suppress residual vibration of a meniscus of the liquid in the nozzle.

6. The liquid discharge apparatus according to claim 1, further comprising a temperature detector configured to detect the head temperature.

7. The liquid discharge apparatus according to claim 1, wherein the circuitry is configured to:

apply a first drive signal to the pressure generator in response to the head temperature being higher than the predetermined temperature;

apply a second drive signal to the pressure generator in response to the head temperature being equal to the predetermined temperature; and apply a third drive signal to the pressure generator in response to the head temperature being lower than the predetermined temperature, and a time of a center of the holding element of each of the first drive signal, the second drive signal, and the third drive signal is identical to each other, an application time of the holding element of each of the first drive signal, the second drive signal, and the third drive signal is different from each other, and a voltage of the holding element of each of the first drive signal, the second drive signal, and the third drive signal is identical to each other.

8. The liquid discharge apparatus according to claim 1, wherein the circuitry is configured to:

apply a first drive signal to the pressure generator in response to the head temperature being higher than the predetermined temperature;

apply a second drive signal to the pressure generator in response to the head temperature being equal to the predetermined temperature; and apply a third drive signal to the pressure generator in response to the head temperature being lower than the predetermined temperature, and a time of a start of the contraction element of each of the first drive signal, the second drive signal, and the third drive signal is identical to each other, an application time of the holding element of each of the first drive signal, the second drive signal, and the third drive signal is different from each other, and a voltage of the holding element of each of the first drive signal, the second drive signal, and the third drive signal is identical to each other.

9. The liquid discharge apparatus according to claim 1, wherein the circuitry is configured to:

apply a first drive signal to the pressure generator in response to the head temperature being higher than the predetermined temperature;

apply a second drive signal to the pressure generator in response to the head temperature being equal to the predetermined temperature; and apply a third drive signal to the pressure generator in response to the head temperature being lower than the predetermined temperature, and a time of a start of the contraction element of each of the first drive signal, the second drive signal, and the third drive signal is identical to each other, an application time of the holding element of each of the first drive signal, the second drive signal, and the third drive signal is different from each other, voltages of the expansion element and the contraction element of each of the first drive signal, the second drive signal, and the third drive signal are identical to each other, and a voltage of the holding element of each of the first drive signal, the second drive signal, and the third drive signal is different from each other.

10. A head drive controller comprising:

circuitry configured to apply a drive signal to a liquid discharge head to drive the liquid discharge head to discharge a liquid, the drive signal including at least one drive pulse, wherein the drive pulse includes:

an expansion element to expand a liquid chamber in the liquid discharge head to a first volume;

a holding element to hold the first volume of the liquid chamber expanded by the expansion element for a predetermined time; and a contraction element to contract the liquid chamber from the first volume held by the holding element to a second volume, and the circuitry is configured to change a time from a start of the expansion element to an end of the holding element based on at least one of viscosity of the liquid or a head temperature that is a temperature in a vicinity of the liquid discharge head, wherein the circuitry is configured to change the time from the start of the expansion element to the end of the holding element to be longer than one half of a natural period of the liquid chamber in response to the head temperature being higher than a predetermined temperature.

11. The head drive controller according to claim 10, wherein the circuitry is configured to change the time from the start of the expansion element to the end of the holding element to be shorter than one half of the natural period of the liquid chamber in response to the head temperature being lower than the predetermined temperature.

12. The head drive controller according to claim 10, wherein the circuitry is configured to change the time from the start of the expansion element to the end of the holding element to be equal to one half of the natural period of the liquid chamber in response to the head temperature being equal to the predetermined temperature.

13. A liquid discharge method comprising:

applying a drive signal to a liquid discharge head to drive the liquid discharge head to discharge a liquid, the drive signal including at least one drive pulse, wherein the applying comprises:

expanding a liquid chamber in the liquid discharge head to a first volume by an expansion element;

holding the first volume of the liquid chamber expanded by the expansion element for a predetermined time by a holding element; and contracting the liquid chamber from the first volume held by the holding element to a second volume by a contraction element, and changing a time from a start of the expansion element to an end of the holding element based on at least one of viscosity of the liquid or a head temperature in a vicinity of the liquid discharge head, wherein the changing comprises changing the time from the start of the expansion element to the end of the holding element to be longer than one half of a natural period of the liquid chamber in response to the head temperature being higher than a predetermined temperature.

14. The liquid discharge method according to claim 13, wherein the changing comprises changing the time from the start of the expansion element to the end of the holding element to be shorter than one half of the natural period of the liquid chamber in response to the head temperature being lower than the predetermined temperature.

15. The liquid discharge method according to claim 13, wherein the changing comprises changing the time from the start of the expansion element to the end of the holding element to be equal to one half of the natural period of the liquid chamber in response to the head temperature being equal to the predetermined temperature.

* * * * *